(12) United States Patent
Nakane et al.

(10) Patent No.: US 6,247,571 B1
(45) Date of Patent: Jun. 19, 2001

(54) POWER TRANSMITTING MECHANISM WITH TWO HYSTERESIS MECHANISMS

(75) Inventors: Mototaka Nakane, Toyota; Masaru Ebata, Chita; Masakazu Kamiya; Kiyonori Kobayashi, both of Aichi; Shuji Sadakari, Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 08/921,067

(22) Filed: Aug. 29, 1997

(30) Foreign Application Priority Data

Aug. 30, 1996 (JP) .................................................. 8-249095
Sep. 3, 1996 (JP) .................................................. 8-252399

(51) Int. Cl.$^7$ ..................................................... F16D 3/14
(52) U.S. Cl. .................. 192/205; 192/210.1; 192/214.1; 74/574; 474/68
(58) Field of Search .............................. 192/205, 70.17, 192/110 B, 214, 214.1, 207, 55.4, 212, 209, 210, 210.1, 211; 464/64, 66, 67, 68; 74/574, 462; 409/8, 9

(56) References Cited

U.S. PATENT DOCUMENTS

| 4,709,796 | * 12/1987 | Uenohara | 192/70.17 X |
| 4,751,993 | * 6/1988 | Fukushima | 74/574 X |
| 4,782,933 | 11/1988 | Jäckel et al. . | |

(List continued on next page.)

FOREIGN PATENT DOCUMENTS

| 3436012 | 4/1986 | (DE) . |
| 19830208 | 1/1999 | (DE) . |
| 2633683 | 1/1990 | (FR) . |
| 2 269 440 | 2/1994 | (GB) . |
| 56-43176 | 10/1981 | (JP) . |
| 61-223348 | 10/1985 | (JP) . |
| 2-35077 | 9/1990 | (JP) . |
| 95/14181 | 5/1995 | (WO) . |

OTHER PUBLICATIONS

Mark's Standard Handbook for Mechanical Engineers, 10th ed. Boston, McGraw Hill, 1996. pp. 3–8. TJ151.S82 1996.*
Kalpakjian, Serope. Manufacturing Engineering and Technology. Reading, MA, Addison–Wesley, Dec. 1995. p. 54, 215, 245.*

*Primary Examiner*—Charles A Marmor
*Assistant Examiner*—Ankur Parekh
(74) *Attorney, Agent, or Firm*—Burns, Doane, Swecker & Mathis, LLP

(57) ABSTRACT

A power transmitting mechanism is provided in which a driving member rotatingly transmitting power and a driven member receiving the transmitted power are arranged concentrically for rotation relative to each other. A torsion member is accommodated between the driving member and the driven member. A first hysteresis mechanism including at least one friction member is provided on the inner peripheral side of a spacing accommodating the torsion mechanism. The friction member of the first hysteresis mechanism may be split into a plurality of portions each passing through, with clearance, a respective hole or cut-out in the driven member. A second hysteresis mechanism including at least one friction member is arranged outside the space accommodating the torsion mechanism. The second hysteresis mechanism generates hysteresis separate from that generated by the first hysteresis mechanism. The torsion member may be plural torsion springs with differing spring constants. A flywheel is connected to the driven member and a clutch mechanism is either abutted against or substantially spaced apart from the flywheel.

16 Claims, 10 Drawing Sheets

U.S. PATENT DOCUMENTS

| | | | |
|---|---|---|---|
| 4,857,032 | * | 8/1989 | Aiki et al. .......................... 192/205 X |
| 4,884,996 | * | 12/1989 | Schmitt et al. ........................ 464/68 |
| 4,904,225 | * | 2/1990 | Worner et al. .................... 192/205 X |
| 5,111,924 | * | 5/1992 | Reik et al. .......................... 74/574 X |
| 5,125,872 | * | 6/1992 | Reik ....................................... 464/67 |
| 5,156,249 | * | 10/1992 | Friedmann ........................ 192/214.1 |
| 5,176,233 | * | 1/1993 | Woerner et al. .................... 74/574 X |
| 5,180,335 | * | 1/1993 | Maucher et al. ................... 464/66 X |
| 5,411,439 | * | 5/1995 | Sacher ................................... 464/67 |
| 5,441,452 | * | 8/1995 | Jacket et al. ....................... 464/64 X |
| 5,471,896 | * | 12/1995 | Schierling et al. .............. 192/201 X |
| 5,484,338 | * | 1/1996 | Watanabe et al. ...................... 464/68 |
| 5,558,579 | * | 9/1996 | Tsuchiya et al. ...................... 464/64 |
| 5,597,335 | * | 1/1997 | Morishita et al. ............ 192/214.1 X |
| 5,649,864 | * | 7/1997 | Rohrle et al. ................. 192/214.1 X |
| 5,667,053 | * | 9/1997 | Rohrle et al. ....................... 74/574 X |
| 5,759,105 | * | 6/1998 | Bochot et al. ......................... 464/68 |
| 5,761,970 | * | 6/1998 | Bonfilio ............................. 464/68 X |
| 5,772,519 | * | 6/1998 | Feigler ................................... 464/68 |

* cited by examiner

POWER TRANSMITTING MECHANISM WITH TWO HYSTERESIS MECHANISMS

TECHNICAL FIELD OF THE INVENTION

This invention relates to a power transmitting mechanism and, more particularly, to a power transmitting mechanism for transmitting the motive power from an engine side to a transmission mechanism side with the possibility of connecting/disconnecting the motive power and of absorbing torque fluctuations.

BACKGROUND

As an example of the conventional power transmitting mechanism FIGS. 4 and 5 of the British Patent GB2269440 show a torque fluctuation absorbing device. Referring to FIGS. 4 and 5, the torque fluctuation absorbing device provided for absorbing torque fluctuations between an engine and a transmission includes driving members 53, 54, 60, driven members 55, 56, 59, a coil spring 50 as a torsion mechanism and a hysteresis mechanism 62 provided between lateral sides of the driving member (driving plate) 53 and the driven member (driven plate) 56 for exhibiting hysteresis by frictional sliding. The driving power from the engine is transmitted from the driving member 60 via 53, 54, coil spring 50 and driven member 55 to 56 and 59. A roller bearing 61 is mounted between the outer periphery of the driving member 60 and the inner periphery of the driven member 59 for holding the driven member (flywheel) 59 concentrically and for free relative rotation with respect to the driving member (inner hub) 60.

A torque fluctuation absorbing device having a flange-shaped slide bearing inserted radially between the driving member and the driven member, as a bearing provided between the outer periphery of the driving member and the inner periphery of the driven member for holding the driven member concentrically and for free relative rotation with respect to the driving member, is proposed in JP Patent Publication JP-B-56-43176. This slide bearing has slide surfaces on both the the outer periphery of the driving member and the inner periphery of the driven member.

In the torque fluctuation device of GB2269440, a grease is sealed in a spacing holding a torsion spring 50 installed as a torsion member on the outer periphery of the device. As a seal on the inner periphery of the spacing, a seal 58 and a thin spring plate in the compressed state are arranged axially between the inner peripheral portion of the driven plate 56 and the inner peripheral portion of the driving plate 54 for allowing for relative rotation between the driving plate 54 and the driven plate 56 and for displaying the sealing function.

Also, in the device of GB2269440, a driving member (driving plate) 53 is formed of iron for reducing the cost.

Referring to FIG. 4 showing the device of GB2269440, the outer peripheral sides of spring sheets 51, 52 are extended between the outer peripheral side of the torsion spring 50 and the inner periphery of the driving side plates 53, 54, on the outer peripheral side of the torsion spring 50 and on the inner peripheral sides of the driving plates 53, 54, for preventing the torsion spring 50 from being moved under centrifugal force towards the outer periphery to come into sliding contact with the driving plates 53, 54.

SUMMARY OF THE DISCLOSURE

However, through eager investigation towards the present invention, the following problems have been encountered.

First of all, if the roller bearing is used as in the torque fluctuation absorbing device of the above GB2269440, the cost is increased. Moreover, the slide bearing disclosed in JP-B-56-43176 has the slide surfaces on both the outer peripheral surface of the driving member and the inner peripheral side of the driven member, so that clatter tends to be produced in the radial direction of the device such that the driving members cannot be maintained in concentric relation with respect to the driven members thus producing vibrations due to the unbalanced concentricity.

Second, referring to FIGS. 4 and 5, in the mechanism for tight sealing of the spacing for holding the torsion spring 50 arranged on the outer periphery of the torque fluctuation device in GB2269440, the seal 58 is provided on the inner periphery of the device for preventing application of a strong pressure caused by rotation of the device, and the grease is moved towards the outer periphery of the device during rotation of the device under centrifugal force, such that the sliding surface of the seal 58 for the driven plate 56 becomes dry to cause progress of wear, with the sealing function being lost to cause the grease to leak out at the seal 58.

In addition, a hysteresis mechanism is provided on the innermost side of the sealed spacing to cause the grease to be deposited on a thrust plate of the hysteresis mechanism or to cause the friction member to become dried depending on the rotational speed of the device to render the hysteresis unstable. Moreover, since the spacing is tightly sealed, heat dissipation properties are worse such that the thrust plate having a small thermal capacity in the dried state is heated to promote wear of the lining to give rise to gradual loss of the hysteresis function.

Third, referring to FIGS. 4 and 5, the driving side plate 53 of GB2269440 is formed of steel plate for reducing the cost. However, if the device is subjected to axial vibrations, the driving plate 53 tends to be cracked or destroyed under the stress produced in a concentrated fashion in the vicinity of the portion of the driving plate 53 secured to the driving shaft.

Fourth, referring to FIGS. 4 and 5, the outer peripheral sides of the spring sheets 51, 52 in GB2269440 are extended to the outer peripheral side of the torsion spring 50 and to the inner peripheral side of the driving plates 53, 54 to consume the spacing so that the housing position of the torsion spring 50 is shifted to the inner peripheral side in an amount corresponding to the spring sheets 51, 52 on its outer peripheral side. Therefore, a problem is raised that, unless a torsion spring 50 of high toughness and large size is used, sufficient torque fluctuation absorbing characteristics cannot be achieved.

In view of the above problems, it is an object of the present invention to provide a power transmitting mechanism and various component portions thereof having improved durability.

It is another object of the present invention to provide a torsion mechanism, which serves as a component member if the power transmitting mechanism is designed as a torque fluctuation absorbing mechanism, more compact in size.

Further objects of the present invention will become apparent in the entire disclosure.

For accomplishing the above object, a first aspect of the present invention provides a power transmitting mechanism in which a driving member rotatingly transmitting power and a driven member receiving the transmitted power to be rotated are arranged substantially concentrically relative to each other for rotation relative to each other. The driving member is arranged on the inner or outer side and the driven member is arranged on the diametrically outer or inner side; and there is provided a slide bearing between the radial directions of the driving member and the driven member, said slide bearing being substantially concentrically engaged with one of the driving member or the driven member with an opposite peripheral surface thereby being a sliding surface. Preferably, a lubricant is provided in at least one of the slide bearing, driving member and driven member (aspect 1-1).

Preferably (aspect 1-2) the slide bearing is provided in a spacing surrounded by the driving member and the driven member; and further, a lubricant sink is provided radially inwardly of the slide surface in the lateral surface of the slide bearing, and/or in the lateral surface of the driving member and/or the driven member facing the lateral side of the slide bearing. A clearance is provided between the lateral surface of the slide bearing and said at least one of the lateral surfaces of the driving member and the driven member facing the lateral surface of the slide bearing 1 or a groove is provided on the driving member and/or driven member, so that the lubricant accumulated in the sink will be supplied under the centrifugal force to the sliding surface disposed radially outwardly of the lubricant sink. Also preferably (aspect 1-3), there is provided a belleville spring between the lateral surface of the slide bearing and the driving member or the driven member facing the slide bearing. The belleville spring, abutted against the slide bearing for biasing the slide bearing towards the driven member or driving member with respect to the axial direction, prevents lubricant leakage from the lateral surface of the slide bearing along the axial direction. A sealing member is provided on the outer periphery of the belleville spring for preventing lubricant leakage from the outer periphery of the belleville spring in the radially outward direction (aspect 1-4).

According to a second aspect of the present invention the mechanism is constructed so that a torsion mechanism absorbing rotational torque fluctuations of the driving member and the driven member is accommodated between the driving member and the driven member. There is provided, on the inner peripheral side of the spacing accommodating the torsion mechanism, a first hysteresis mechanism having at least one frictional member for generating hysteresis by the sliding of the frictional member relative to the driving member or the driven member. The first hysteresis mechanism is simultaneously used as a sealing mechanism for sealing the inner periphery of the above spacing by abutment of the slide surface of the frictional member and the driving member or the driven member. A second hysteresis mechanism is arranged outside the spacing accommodating the torsion mechanism generating hysteresis different from that generated by the first hysteresis mechanism by the sliding of said frictional member.

Preferably, the frictional member in the first hysteresis mechanism is provided with first and second frictional members. The inner peripheral side of said spacing is sealed by said first hysteresis mechanism.

The outer periphery and the lateral side of the spacing are delimited at least by the driving member.

Axially between the driving members are arranged the first frictional member, driven member, a belleville spring and the second frictional member engaged with the driven member in the rotational direction of the device. The belleville spring operates for biasing the first and second frictional members towards and into abutment against the lateral side of the driving member. The slide surface between the first and second frictional members and the slide surface of the driving member serve as a sealing surface.

According to a third aspect of the present invention there is provided a torsion mechanism for absorbing rational torque fluctuations between the driving member and the driven member is accommodated in a spacing surrounded (or defined) by the driving member and the driven member, and a second hysteresis mechanism having a frictional member is provided outside the spacing for generating hysteresis by the sliding of the frictional member. A belleville spring is arranged axially between the frictional member and one of the driving member and the driven member. The frictional member is retained under the force of friction by the other of the driving member or the driven member under the bias of the belleville spring, the frictional member having a clearance of a pre-set angle in the rotational direction of the device relative to the other of the driving member or the driven member, the frictional member being engageable upon relative rotation between the driving and driven members.

According to a fourth aspect of the present invention there is constructed so that the inner peripheral side of the driving member is secured to a driving shaft, a hole is formed in a mid portion of the driving member and wherein the outer and inner peripheral portions of the driving member are interconnected substantially in an arm-like fashion.

The holes formed in the mid portion of the driving member arc in register in a circumferential direction with bolt holes for bolts secured to the driving shaft (aspect 4-1).

There is provided a substantially annular spacer for positioning the driving member in the axial direction, the driving member being secured to the driving shaft and having a polygonal outer peripheral shape. The polygonal side of the outer periphery of the spacer faces the portion of the driving member connected in an arm-like fashion in the radial direction of the device (aspect 4-2).

According to a fifth aspect of the present invention, there is arranged so that a torsion member for absorbing rotational torque fluctuations is arranged in tandem angularly between the rotational directions of the driving member and the driven member and so that there is provided a spring sheet inserted from an end of the torsion member into the inner cavity for retaining the torsion member in the radial direction.

According to 6th aspect of the present invention, a driving member rotatingly transmitting the power and a driven member receiving the transmitted power to be rotated are arranged substantially concentrically relative to each other via a bearing for rotation relative to each other, wherein the inner or outer race of said bearing is secured to the driven member.

According to a 7th aspect of the present invention, an inertial member is formed on the outer periphery of at least one of the driving member and the driven member.

The above means are applied in general to a power transmitting mechanism in which a driving member rotatingly transmitting the power and a driven member receiving the transmitted power to be rotated are arranged substantially concentrically relative to each other for rotation relative to each other and, more specifically, to a torque fluctuation absorbing device or to a clutch device.

Within the scope of the principle of the present invention disclosed in the specification and the drawings, the first to $7^{th}$ aspects having the above features are applicable to other devices than the torque fluctuation absorbing device provided that such other devices include a torsion mechanism and/or a hysteresis mechanism.

Moreover, according to aspect (2-2) there is arranged so that, in the 2nd aspect, the driving member and the driven member are arranged substantially concentrically relative to each other for rotation relative to each other via a bearing, and so that the first hysteresis mechanism is arranged on the inner peripheral side of the torsion mechanism and on the outer peripheral side of the bearing.

By these means, the operating radius of the frictional member can be enlarged so that a large frictional torque can be obtained even if the surface pressure applied to the frictional member is lowered.

In the aspect (2-3), the frictional member of the first hysteresis mechanism is clampedly held within said driving members via a belleville spring or a thrust plate.

By these means, since the driving member (such as two driving plates sandwitching the frictional member in-between) has the function of holding the frictional member, there is no necessity of separately providing a member for holding the frictional member. In addition, since the driven member is passed through by the frictional member, both lateral sides of the frictional member can be clamped by the driving member, while a pre-set clearance can be provided angularly between the frictional member and the driven member.

In aspect (2-4), the frictional member is passed through a hole or cut-out formed in the driven member and a clearance is present circumferentially between the hole or cut-out and the passing portion of the frictional member.

By these means, there is produced substantially no frictional force by the amplitude (torque fluctuations) corresponding to the gap in the circumferential direction, with the frictional force being generated after generation of the amplitude exceeding an extent of amplitude corresponding to the gap. That is, hysteresis can be changed in meeting with the amplitude.

According to aspect (2-5), the frictional member of the first hysteresis mechanism is split into plural portions.

According to aspect (2-6), a circumferentially extending groove guiding the sliding of the frictional member of the first hysteresis mechanism is formed in the driving member.

By these means, the clatter otherwise produced on sliding of the frictional member is reduced such that the frictional member can exhibit stabilized frictional force at all times.

According to aspect (2-7), means for holding the frictional member is provided in opposition to centrifugal force operating on the frictional member.

According to aspect (2-8), split portions of the frictional member are passed through a hole or a cut-out formed in the driven member, respectively; a clearance is formed circumferentially between the passing portion of the split frictional member through the driven member and the hole or cut-out; and at least one of the clearances has a size different from the other clearances By these means, the hysteresis can be changed stepwise.

According to aspect (2-9), at least one of the clearances is substantially a zero clearance.

By these means, the first hysteresis mechanism exhibits respective different sorts of hysteresis for small torque fluctuations and for large torque fluctuations, so that a common mechanism can be used for the first and second (generally, multi-step) hysteresis mechanisms.

According to aspect (2-10), a frictional surface area of the frictional member having a substantially zero clearance from the hole or cut-out of the driven member is larger in measure than a frictional surface area of the other frictional member having a clearance from the hole of cut-out of the driven member.

By these means, since the surface pressure of the frictional member not having the gap between it and the hole or the cut-out in the driven member is lowered, so that an excess force is prevented from being applied to this frictional member subjected to a large shock produced at an initial stage of torque fluctuations.

According to aspect (2-11), in the aspect 2, the second hysteresis mechanism is provided more inwardly of the power transmitting mechanism than the frictional surface of the clutch mechanism capable of disconnecting power transmitting.

According to aspect (2-12), the power transmitting mechanism comprises: a flywheel connected to the driven member; a clutch mechanism abutted against or substantially spaced apart from the flywheel for connecting or disconnecting power transmitting; and a release bearing mechanism axially displacing said clutch mechanism for causing said clutch mechanism to connect or disconnect the power transmitting; the frictional member of the second hysteresis mechanism being slid against the flywheel; the direction of a thrusting force operating on the frictional member being the same as the direction of movement when said release bearing mechanism disconnects the power transmitting via said clutch mechanism.

By these means, since the clatter of the bearing (bearing mounted between the driving member and the driven member or release bearing) along the axis of the device is previously removed, only little loss in the clutch release stroke is incurred even if the frictional member of the second hysteresis mechanism is worn to some extent. Moreover, since the flywheel in general has a large thermal capacity, the mechanism is stabilized in temperature on generation of sliding movement if the flywheel is a counterpart frictional member, thus displaying hysteresis of perpetually stable size As aspect 2-13, in a case where the clutch release bearing mechanism is of a push type to be moved toward the engine side on interruption of power transmitting, the second hysteresis mechanism is arranged on the side of the frictional surface of the flywheel slid against the clutch mechanism.

As to aspect 2-14, if the clutch release bearing mechanism is of the pull type of being moved toward the transmission side on disconnection of power transmitting, and the second hysteresis mechanism is arranged on the side of the surface of the flywheel facing the engine.

As aspect 2-15, the frictional member of the second hysteresis mechanism is split into plural portions.

By these means, the frictional member is improved in yield by splitting the frictional member (by reducing the size) than if the frictional member is designed as a single member, thus improving the yield of the frictional member (if the frictional member is of the sheet type). In addition, the production volume per shot is increased (if the frictional member is of the resin type). Further, an angular clearance is disposed between an innerring engaged with an engine output shaft and the frictional member of the second hysterisis mechanism.

As aspect (2-16), in the aspect 2, a thrust plate is arranged between the frictional member of the second hysteresis mechanism and the driving member or the driven member; and a protrusion to be engaged in a hole formed in the thrust plate for circumferentially engaging with the frictional member is provided on the frictional member of the second hysteresis mechanism.

By these means, the plural frictional members can be respectively set in position.

As aspect (2-17), an inner ring is provided on the peripheral surfaces of the plural frictional members and the peripheral surface of the inner ring is engaged or engageable with the plural frictional members with respect to the circumferential direction; the frictional members having circumferential gaps relative to each other; and the peripheral surface of the inner ring is formed with holes communicating with the gaps between the frictional members.

By these means, the spacing in which the frictional member of the second hysteresis mechanism slides and the outside communicate with each other to improve frictional surface cooling performance and extrusion performance of the frictional powders, the frictional force is decreased (the frictional force by the debris of the frictional powders can be prevented from being increased) this chronologically stabilizing the frictional torque.

As aspect (2-18), in the aspect 2, there is provided a thrust spring biasing the frictional member of the second hysteresis mechanism towards the sliding surface of the frictional member; the biasing force of the thrust spring acting in the same direction as the direction in which the bearing arranged between the driving member and the driven member is inhibited from pulling-out.

By these means, there is no necessity of providing a separate bearing extraction-inhibiting member arranged between the driving member and the driven member.

As aspect (2-19), in the aspect 2, the frictional member of the second hysteresis mechanism is formed of polyimide.

By these means, not only is the abrasion resistance increased, but the frictional torque is stabilized.

As aspect (5-1), the torsion member includes plural torsion springs having different spring constants; provided that in the plural torsion springs arranged in tandem, the torsion springs with smaller spring constants are arranged on both ends and the torsion springs with larger spring constants are arranged on the inner side.

By these means, both end ones of tandem-arranged torsion springs can be reduced in size (and hence in weight) to diminish the impact between the sheet and the driving member or the driven member (driving plate).

As aspect (5-2), both end ones of the plural torsion springs arranged in tandem are reduced in wire diameter.

By these means, the torsion spring can be prevented from being slid against and worn out by the inner wall member of the driving plate as a result of being biased radially outwards by the centrifugal force into abutment with the inner wall member.

As aspect (5-3), the torsion member is a coil spring on the end of which is arranged a spring sheet, and a radially mid portion of said spring sheet is formed with a boss portion protruded in the circumferential direction for being fitted on said coil spring.

By these means, since the boss portions are abutted against each other directly or via a pre-set member on maximum flexure of the torsion spring to limit excess flexure of the coil spring to prevent fracture thereof.

As aspect (5-4), a maximum amount of compression of the coil spring is determined by the circumferential length of said boss portion.

By these means, the intermediate spring sheet can be unified in shape, such as in peripheral length of the boss portions, so that the number of different types of the material can be reduced.

As aspect (5-5), the plural torsion springs, arranged in tandem have the same length at a maximum compression.

By these means, since the boss portion becomes short, by the provision of the stopper pin, the moment applied to the boss portion is decreased to reduce the risk of fracture.

As aspect (5-6), a stopper pin is arranged on the inner periphery of the torsion spring between said boss portions arranged on both ends of the torsion spring.

By these means, the intermediate spring sheet can be unified in shape, so that the number of different types of the material can be reduced.

As aspect (5-7), the stopper pin has a circumferential defined by the difference between the maximum compression length of the torsion spring and the length of said boss portions protruded from both ends of the torsion spring in the peripheral direction of the boss portions.

By these means, the amount of flexure of the mid portion of the coil spring is proportionate to its load, while the allowable stress (elastic force) is proportional to the amount of flexure of the maximum flexure portion. Thus, if the maximum flexure portion is at a mid portion, the allowable load becomes maximum.

As aspect (5-8), the torsion spring is a coil spring and wherein the circumferential end faces of the coil spring at an initial position are arranged in an outwardly flared state about the rotation axis so that the circumferential end faces will be parallel at a maximum flexure of the coil spring.

By these means, the allowable flexure and the torsional angle can be enhanced (the torsional angle width capable of absorbing torque fluctuations can be increased). Since the torsional member can be reduced in weight, the centrifugal force applied to the spring sheet is reduced to diminish wear to the sheet.

As aspect (5-9), the torsion member is formed of high elasticity rubber.

By these means, the torsion spring cannot interfere with the sliding surface to prevent its abrasion.

As aspect (5-10), the spring sheet has an outer diameter larger than that of said torsion member.

By these means, the spring sheet formed of glass fiber reinforced nylon is less aggressive to the sliding surface and high in strength.

As aspect (5-11), the spring sheet is formed of glass fiber reinforced nylon.

By these means, the slider is worn out to a lesser extent on sliding so that the tolerance for wear is reduced and hence the slider can be rendered compact.

As aspect (5-12), as slider of a high wear resistance and a low frictional coefficient is arranged between the spring sheet and the inner wall surface of the driving member surrounding the outer periphery of the spring sheet.

By these means, the thermal expansion coefficient of the two component members are approximate to each other thus reducing the thermal stress.

As aspect (5-13), the spring sheet is formed of glass-fiber-reinforced nylon and said slider is formed of polyimide.

By these means, the spring sheet of polyimide is superior in thermal resistance and undergoes less wear at higher temperatures. Moreover, it is less corrosive against the sliding surface to reduce the wear. In addition, the spring sheet is lower in frictional coefficient thus reducing the hysteresis for smaller amplitude values.

As aspect (5-14), the spring sheet is formed of polyimide.

By these means, if the driven disk thrusts and urges the spring sheet in the circumferential direction, the spring sheet is moved away from the guide surface (inner wall surface of the driving plate), so that these is produced no wear on occurrence of the load torque.

As aspect (5-15) the driven member has a circumferential protrusion for supporting the centrifugal force acting on the spring sheet; and of a surface facing the circumferential end face of the driven member for guiding the sliding of the spring sheet has a radius gradually increasing in a direction in which the driven member biases the spring sheet arranged facing the circumferential end face of the driven member.

By these means, surface roughness can be lowered by turning thus reducing wear to the spring sheet.

As aspect (5-16), in a surface facing the outer peripheral surface of the spring sheet for guiding the sliding of the spring sheet, defects extending in a direction perpendicular to the sliding direction of the spring sheet are removed by turning.

As aspect (5-17), a clearance is provided for enabling turning of an outer wall of its drawn shape portion of the driving plate of the driving member to form a circumferential receiving surface of the spring sheet.

As aspect (5-18), a clearance is provided against the spring sheet for preventing interference with a step difference with a receiving surface for the spring sheet formed by turning the outer wall of the driving plate.

As aspect (5-19), the inner diameter of the inner wall surface of the driving member surrounding the outer periphery of the spring sheet is selected to be larger than the outer diameter of the torsion member.

By these means, defects due to press-working tend to be produced in a direction perpendicular to the sliding direction on the inner wall surface of the driving plate. These press working defects tend to promote wear in the spring sheet. By using the rolled steel plate to the sliding surface of the spring sheet, the sliding surface can be formed to a mirror surface thus reducing the wear to the sprig sheet.

As aspect (5-20), a rolled steel plate is arranged radially between the inner wall surface of the driving member surrounding the outer periphery of said spring sheet and said spring sheet.

By these means, if the driven disk thrusts and moves the spring sheet in the circumferential direction, the spring sheet is displaced away from the inner wall surface of the rolled steel plate, no wear is produced on occurrence of the load torque.

As aspect (5-21), the rolled steel sheet has a rolling direction extending along the sliding direction of the spring sheet. Preferably, the rolled steel sheet has a mirror finished surface directed toward the spring sheet.

As aspect (5-22), a block member for thrusting the torsion member in the circumferential direction is mounted on said driving member.

By these means, since an oil film is formed on the sliding surface, not only is the wear prevented, but is the frictional resistance reduced.

As aspect (5-23), grease is applied to the outer peripheral surface of said spring or to the inner wall surface of said driving member along which said spring sheet slides.

By these means, the mud and soil intruded into the torsion working chamber can be discharged, at the same time as the cooling effect is enhanced by the increased air flow.

As aspect (5-24), the driving member includes a first driving plate and a second driving plate abutted against each other, the torsion member being dispose in a spacing surrounded by the first and second driving plates; and a gap for establishing communication of the spacing housing the torsion member with the outside is provided in an abutment surface of the first and second driving plates.

As aspect (5-25), the gap is a recess formed in the first driving plate or the second driving plate.

As aspect (6-1), an inner race securing the bearing is an elastic plate-like member.

By these means, by using, as a member to which is secured the bearing, an elastic plate-shaped member, preferably a press-worked molded article of a steel plate, it becomes possible to prevent the elastic force from being generated in the bearing press-fitting portion to apply an excessive pressure to the bearing by dimensional error to reduce cost.

As aspect (6-2), the inner race has a flange surface for supporting the second hysteresis mechanism and the bearing relative to the axial direction.

By these means, this flanged surface displays the functions of preventing extraction of the bearing and of holding the axial load applied to the hysteresis mechanism.

As aspect (6-3), a thrust plate abutted against the frictional member and having its one end extending towards the flanged surface is arranged between the axial directions of the frictional member of the second hysteresis mechanism and the flanged surface; and the flanged surface is formed with a cut-out or hole for inhibiting rotation of the thrust plate, the cut-out or hole being engageable by a portion of the thrust plate extending towards the flanged surface.

By these means, the thrust can be prevented from rotation to set the operating conditions for the second hysteresis mechanism.

As aspect (6-4), a surface of said driving member facing the engine side surface of the bearing is abutted against one of the end face or the inner ring or the end face of the outer ring of said bearing without being abutted against the other surface.

By these means, the engine-side axial load holding member of the bearing may be eliminated.

As aspect (6-5), the driven member includes a driven disk arranged between two driving disks as the driving member and a flywheel slidably contacted with a clutch mechanism capable of connecting and disconnecting the power transmitting, the flywheel supporting the bearing; and the driven disk and the flywheel are secured to each other by bolting.

By these means, there is produced no deformation such as is produced on riveting the driven disk and the flywheel to each other. In addition, it becomes possible to prevent an excessive load from being applied to the bearing to elongate the bearing service life.

As aspect (7-1), an inertial member supported by the driving member is provided on the outer periphery of the driving member.

By these means, by providing the inertial member on the outer peripheral portion, the inertial of J1 (driving side) is enlarged for decreasing the amplitude of input vibrations.

As aspect (7-2), the inertial member is formed by roll forming a steel strip or a drawn material.

As aspect (7-3), the inertial member is secured by welding to the driving member.

By these means, butt-welding of the sole inertial member can be eliminated (the inertial member can be pre-welded to the driving plate).

As aspect (7-4), an inertial member is formed by axially drawing an outer peripheral portion of said driving member.

By these means, the inertial can be enlarged easily.

As aspect (7-5), a ring-shaped inertial member is arranged which is formed by roll forming the steel strip or the drawn material on the inner side of a drawn portion formed on the outer periphery of the driving member.

By these means, since the centrifugal force of the ring-shaped inertial member is supported by the drawn portion of the driving member (driving plate), the ring-shaped inertial member can be secured easily in position.

As aspect (7-6), the ring-shaped inertial member is caulked at the drawn portion formed on the outer periphery of the driving member.

As aspect (7-7), the driving member includes a first driving plate and a second driving plate and second driving plate is caulked at a tongue portion of the first driving plate.

By these means, the number of steps is reduced because the step of securing the first and second driving plates and the step of securing the inertial member are carried out simultaneously.

As aspect (7-8), an inertial member is provided on the outer periphery of the flywheel.

By these means, the inertial on the driven side is increased such that rotational fluctuations are reduced against torque fluctuations via torsion spring.

As aspect (7-9), the toothed surface of a starting ring gear provided on the outer peripheral side of said driving member is chamfered in an amount corresponding to the tooth height.

By these means, since the chip outlet side is chamfered during hobbing, burrs are less liable to be produced to render it possible to omit the deburring step.

As aspect (7-10), a spacer is arranged between an axial end face of a crankshaft transmitting the motion from an engine and said driving member.

By these means, since the axial height (axial position of e.g., the driving plate) can be modified by simply changing the spacer height to render is possible to use the main body portion in common.

As aspect (7-11), the driving member includes a first driving plate and a second driving plate; a torsion member of resin for absorbing rotational torque fluctuations is arranged in tandem between, of the device-rotating direction, the driving member and the driven member; and the driving member and the driven member are welded together at a position remote from the resin torsion member.

By these means, the resin sheet is not affected by the welding heat during welding of the first and second driving plates.

The above respective means are applied in general to a power transmitting mechanism in which a driving member run rotatingly transmitting the power and a driven member receiving the transmitted power to be rotated are arranged substantially concentrically relative to each other for rotation relative to each other and specifically to a torque fluctuation absorbing device or to a clutch device.

The above respective means, having the above features, may be applied to devices other than the torque fluctuation absorbing device of the generalized structure having the torsion mechanism and/or the hysteresis mechanism.

The meritorious effects of the various aspects and embodiments of the present invention will be briefly stated below, however, other advantages and functions will become apparent in the entire disclosure.

With the power transmitting mechanism of the present invention, as described above, the slide bearing mechanism making up the power transmitting mechanism, the torsion mechanism, the inner peripheral sealing mechanism of the torsion mechanism, first hysteresis mechanism, second hysteresis mechanism and the driving members can be improved in durability without raising the cost. By constituting the power transmitting mechanism, such as the torque fluctuation absorbing device, the power transmitting mechanism can be improved in durability.

In particular, with the power transmitting mechanism having the slide bearing, according to the present invention, clatter of the driving and driven members may be suppressed for decreasing vibrations during rotation. Also, with the power transmitting mechanism having the torsion mechanism, according to the present invention, the tight sealing capability of the spacing housing the torsion mechanism by the frictional members is improved. If the lubricant is sealed in this spacing, the inhibiting capability of lubricant leakage is improved while the frictional members exhibit hysteresis functions. By providing the hysteresis mechanism outside the spacing housing the torsion mechanism, the hysteresis mechanism is improved in heat dissipation characteristics to improve durability. This mechanism is not affected by the lubricant occasionally enclosed in the above spacing by provision of the hysteresis mechanism outside the spacing resulting in a stabilized hysteresis. By providing holes at the pre-set portions of the driving member, the driving member has a lowered rigidity in the axial direction, that is becomes substantially elastic, so that in particular the vibrations along the axis of the device may be absorbed for preventing fracture of the driving members. Furthermore, by retaining the torsion spring on its inner periphery, the torsion spring may be arranged on the more outer peripheral side than heretofore thus realizing a lowered rigidity and compact size of the torsion spring.

DETAILED DESCRIPTION OF THE EMBODIMENTS

Figure 1:
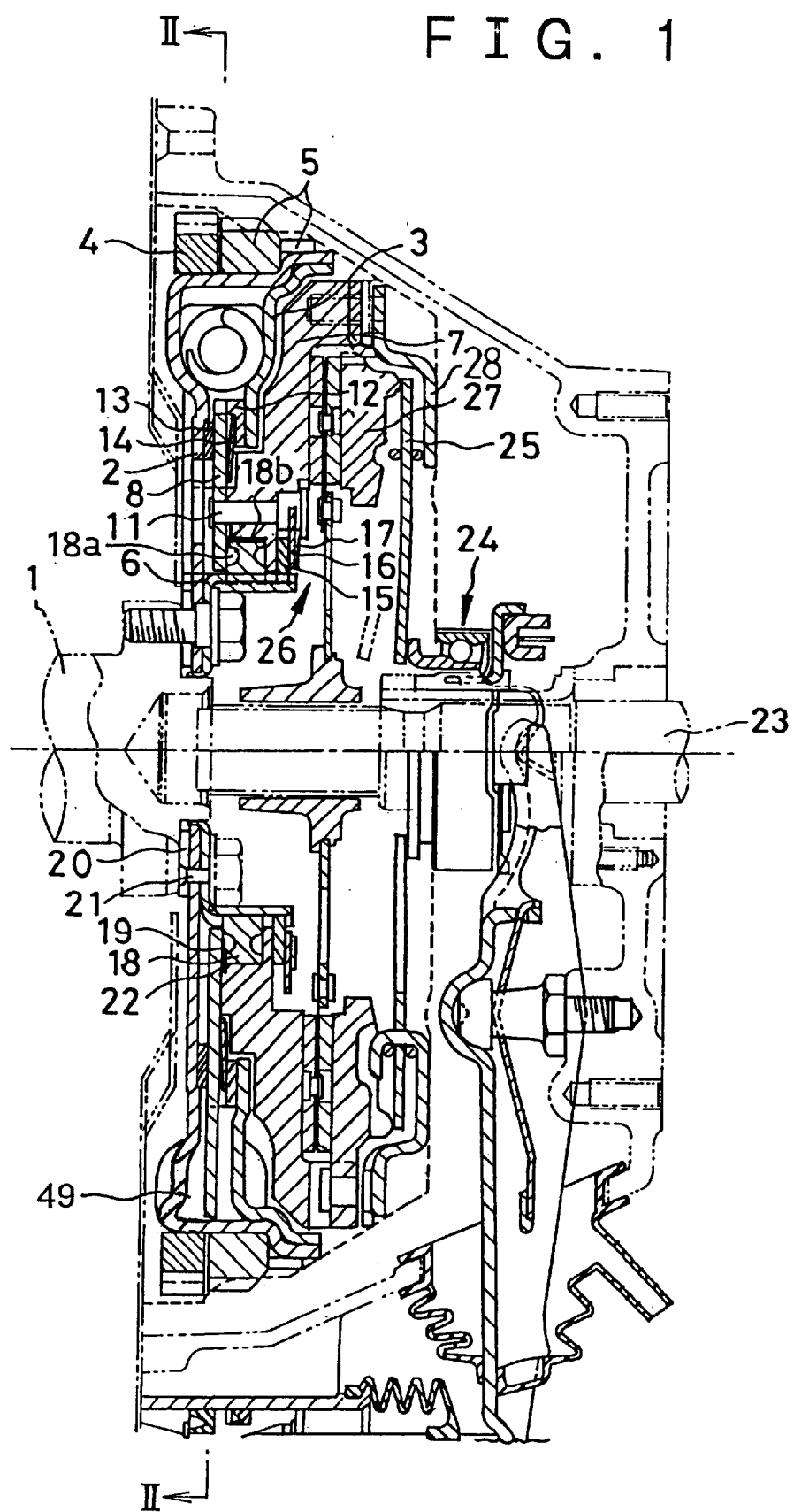
FIG. 1 is a cross-sectional side view of a power transmitting mechanism according to an embodiment of the present invention.

Referring to the drawings, preferred embodiments of the present invention will be explained in detail.

Figure 2:
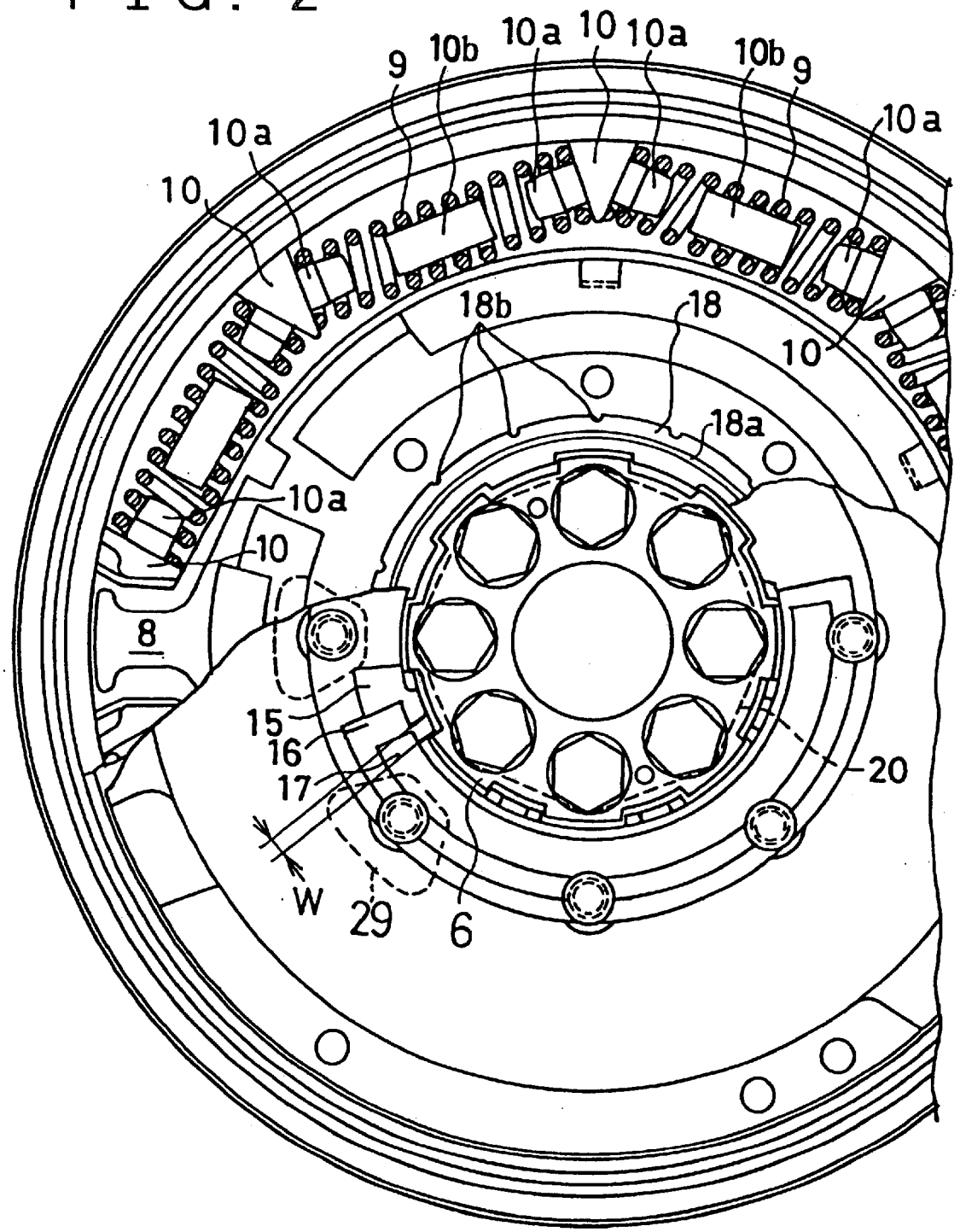
FIG. 2 is a cross-sectional view along line II—II of FIG. 1, with portions being broken away.
Figure 3:
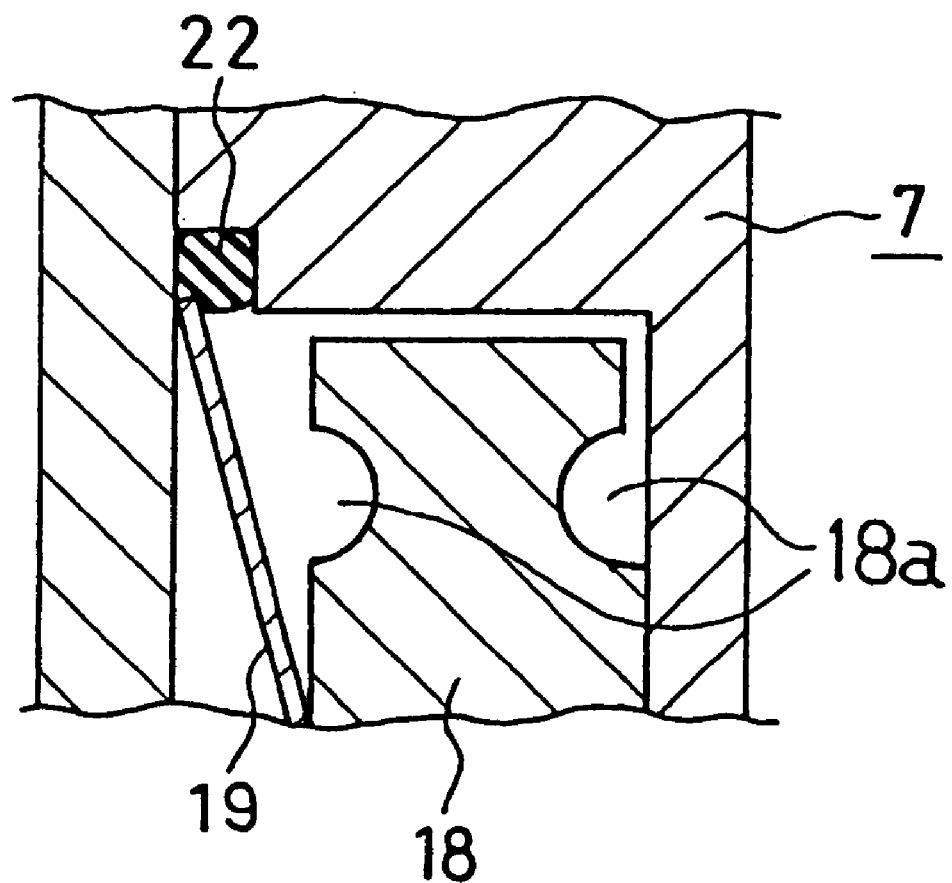
FIG. 3 is an enlarged view showing the vicinity of a slide bearing shown in FIG. 1.
Figure 4:
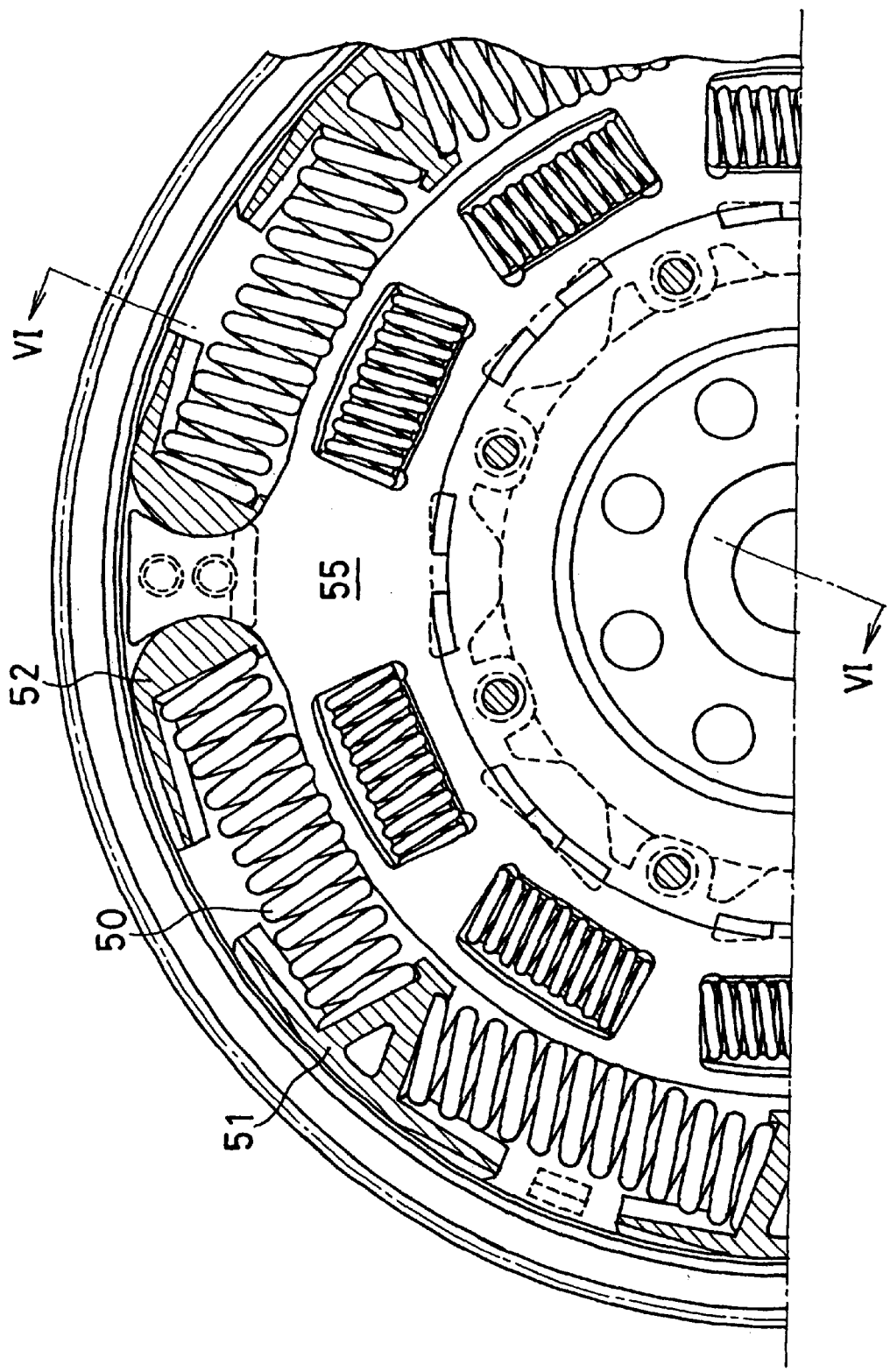
FIG. 4 is a front view showing a prior-art torque fluctuation absorbing device, with portions being broken away.
Figure 5:
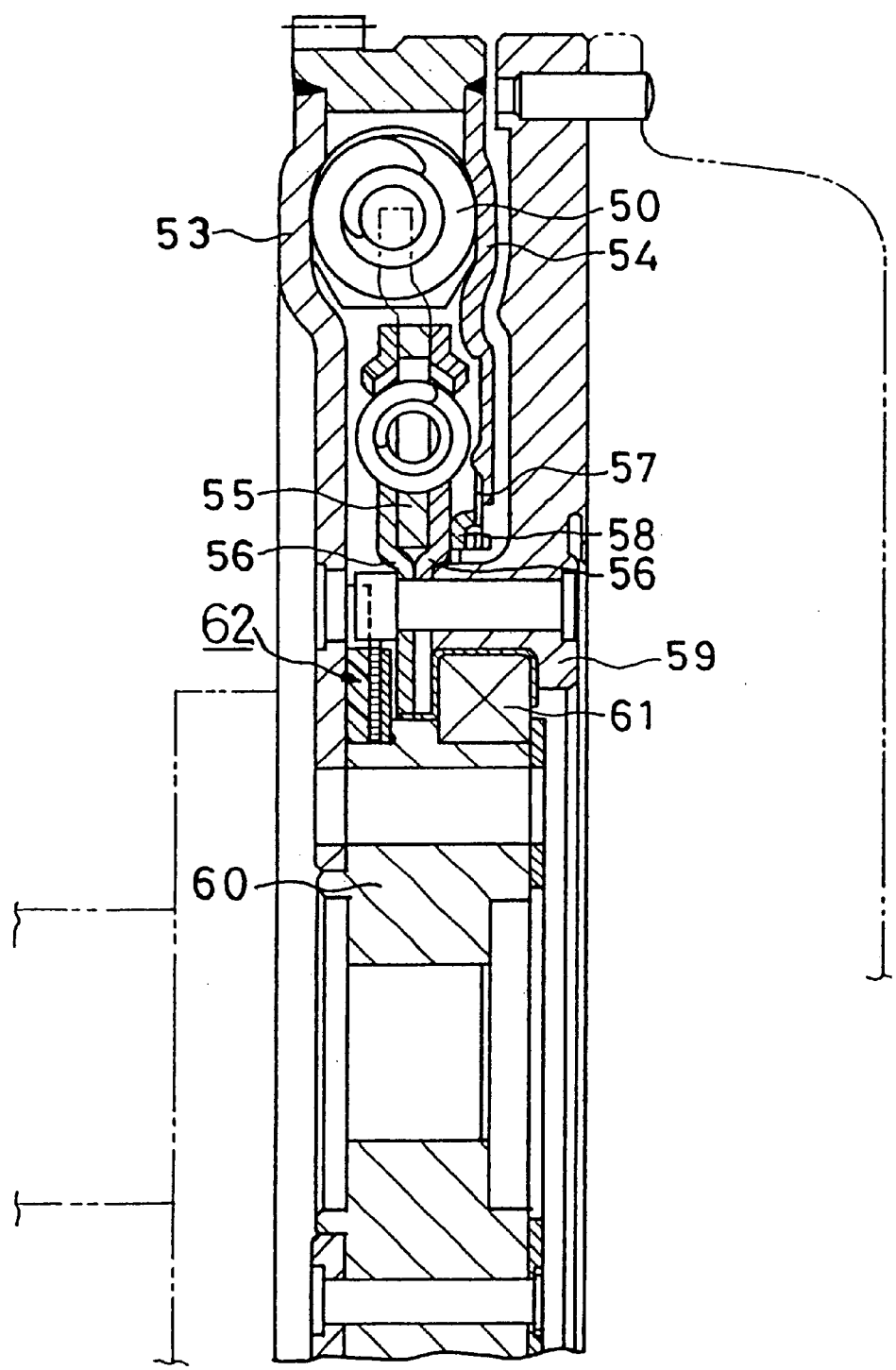
FIG. 5 is a cross-sectional side view of the torque fluctuation absorbing device shown in FIG. 4.

FIG. 1 shows, in a cross-sectional side view, a power transmitting mechanism embodying the present invention. FIG. 2 is a cross-sectional view taken along line II—II in FIG. 1, with a portion thereof being broken away. FIG. 3 shows a slide bearing shown in FIG. 1 and the vicinity thereof to an enlarged scale.

Referring to FIGS. 1 to 3, a first driving plate 2, bolted to an engine crank shaft 1, a second driving plate 3, welded to the entire outer peripheral surface of the first driving plate 2, a ring gear 4, an inertia ring 5 and an inner ring 6 make up engine side inertial members (driving members) J1, while a flywheel 7 and a driven disk 8 that can be brought into sliding contact with a frictional clutch disk assembly 26 make up transmission side inertial members (driven members) J2. The engine torque is connect-/disconnectably entered to an input shaft 23 of the transmission mechanism via two inertial members J1, J2 and via a clutch mechanism. Radially between the inertial members J1, J2 is arranged a slide bearing mechanism for holding the transmission side inertial members J2 relative to the engine side inertial members J1 substantially concentrically and for relative rotation to each other. Angularly between the two inertial members J1 and J2 are arranged a torsion mechanism for absorbing engine rotational torque fluctuations and first and second hysteresis mechanisms, with the first hysteresis mechanism being also used as an inner peripheral side seal for the torsion mechanism. Specifically, the torsion mechanism is arranged in a spacing which is defined (typically surrounded) by axially facing first and second driving plates from outside in both the axial and radial directions, and which also is surrounded by the driven plate 8 and by the first hysteresis mechanism from inside in the radial direction. The inner peripheral portions of the inner ring 6 and the first driving plate 2 are axially positioned by a spacer 20 having a polygonal outer rim portion, with the inner ring 6 being engaged by a rivet 21 with the inner periphery of the first driving plate 2. Since the axial heights of the various members can be adjusted by varying the plate thickness of the spacer 20, the power transmitting mechanism conforming to different car types can be designed simply by changing the plate thickness of the spacer 20, such that the main body portion of the power transmitting mechanism may be used in common for different car types. On the transmission side of the flywheel 7 are arranged a clutch disk assembly 26, a diaphragm spring 25 and a release bearing mechanism 24. Since the release bearing mechanism 24 is biased by a release fork towards the engine side, if the inner periphery of the diaphragm spring 25 is biased towards the engine, the force by which the diaphragm spring 25 biases the clutch disk assembly 26 towards the flywheel 7 via a pressure plate 27 becomes weaker, so that the clutch disk assembly 26 is spaced apart from the flywheel 7 to momentarily interrupt the transmission of the engine motive power. The structures of the respective mechanisms will be explained hereinafter in detail.

The slide bearing mechanism includes an inner ring 6 secured by a rivet 21 to the first driving plate 2 and bent in the axial direction from the radial direction of the device so that its distal end is extended along the axis, a slide bearing 18 arranged in spacing surrounded by a lateral surface of the driven plate 8 and an axial recess of the flywheel 7 and having a sliding fit on the outer periphery of the inner ring 6, a belleville spring 19 arranged on the engine side of the slide bearing 18 and a sealing member 22 arranged on the outer periphery of the belleville spring 19. The belleville spring 19 plays the sealing function for the lateral side and the inner surface of the slide bearing 18, while the sealing member 2 plays the sealing function of the outer periphery of the slide bearing 18. In both lateral sides of the slide bearing 18 are formed lubricant sinks (grooves) 18a. At an outer peripheral area of the lubricant sinks 18a, there is an axial clearance between the flywheel 7 and driven plate 8, the lubricant is supplied to the sliding surface through the centrifugal force. Instead of this axial clearance, a radially extending groove or grooves may be disposed for providing a conduit for the lubricant. Further, axially extending grooves 18b are provided on the (outer) sliding surface of the slide bearing 18. The interval between neighboring axial grooves 18b is defined by a smaller angle than the relative torsional angle between the engine side inertia J1 and the transmission side inertia J2. Thus the lubricant supplied from the sink 18a is steadily distributed over the entire sliding surface. The inner ring 6 may be formed by working an iron plate to permit manufacture at a reduced cost.

The torsion mechanism includes four torsion springs 9 arrayed in a spacing surrounded by first and second driving plates 2 and 3 on the outer periphery of the device and rotationally between the first and second driven plates 2, 3 and the driven plate 8. The driven plate 8 holds one end of the torsion spring 9 via a spring sheet (seat) 10. The outer end of the torsion spring is retained by a drawn-formed part of the first and second driving plates 2, 3 or a block shown in FIG. 6, so as to transmit the torque via the torsion spring 9. By this provision, periodical torque fluctuations proper to combustion engines can be absorbed by flexure of the torsion spring, resulting in transmitting a smooth rotational torque to the output shaft 23.

Figure 7:
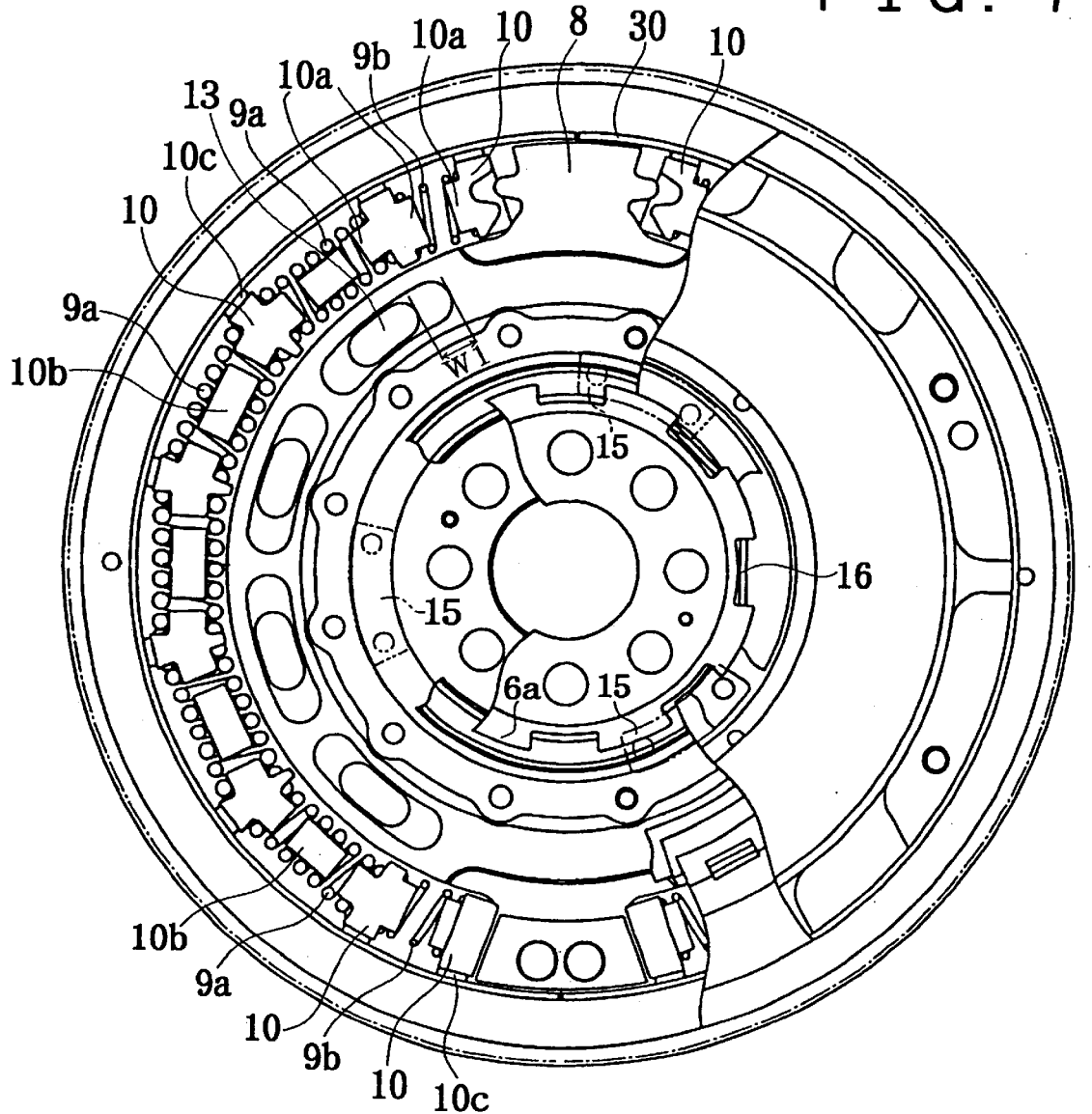
FIG. 7 is a cross-sectional view along line VII—VII of FIG. 6, with portions being broken away.

Further, a stopper 10b is disposed within the torsion spring 9, for permitting abutment between the stopper 10b and a boss portion 10a of the spring sheet 10 when the flexure (compression) of the torsion spring approaches the limit, thereby preventing the torsion spring from overcompression. In case of short setting of the spring length like the case with the torsion spring 9b at the circumferential ends as shown in FIG. 7, the boss portions abut to each other to prevent the overcompression. The spacing is charged (sealed) with a lubricant, such as grease.

Also, a clearance 49 is provided against the spring sheet 10 for preventing interference with a step difference with a receiving surface for the spring sheet 10 formed by turning the outer wall of the first driving plate 2.

The first hysteresis mechanism and the inner peripheral side sealing mechanism of the torsion mechanism are arranged on the inner peripheral side of the first and second driving plates 2, 3 in a vicinity of the torsion mechanism and towards the outer peripheral side of the device, and are comprised of an annular frictional member (thrust lining) 13, driven plate 8, a belleville spring 14 and an annular frictional member (thrust lining) 12, in this order from the first driving plate 2 towards the second driving plate 3 along the axis of the device. The frictional member 13 is positioned by a shoulder portion of the press-worked first driving plate 2. The frictional member 12 has a protrusion which is axially bent from radially outwardly of the device towards an engine engaged in the recess of the driven plate 8 relative to the rotational direction of the device so as to be rotated in unison with the driven plate 8. The belleville spring 14 biases the frictional member 13 towards the first driving plate 2 into abutment against the first driving plate 2 while also biasing the frictional member 13 towards the second driving plate 3 into abutment with the lateral side of the flywheel. The frictional members 13, 12 and the belleville spring fill the gap towards the inner periphery of the driven plate 8 and the first and second driving plates 2, 3 for preventing leakage of the lubricant and are slid relative to the first and second driving plates 2, 3 for displaying a relatively small hysteresis function.

The second hysteresis mechanism exhibiting a relatively large hysteresis function is arranged on the transmission side (output side) of the flywheel 7 outside of the spacing housing the torsion mechanism and the lubricant. The second hysteresis mechanism is arranged on the transmission side of the flywheel 7 on the inner peripheral side thereof along the axis of the device and is made up of an annular frictional member (thrust lining) 15, annular thrust plate 16 and a belleville spring 17 in the axial direction of the device proceeding towards the transmission side. The thrust lining 15 is abutted against and slid in frictional contact with the lateral surface of the flywheel 7. On the inner periphery of the frictional member 15 are formed splined protrusions. In register with these protrusions are formed splined recesses in the outer periphery of an extension of the inner ring 6. These protrusions and recesses have a clearance of a pre-set angle W (FIG. 2) extending along the direction of rotation of the device. When the relative rotation between the engine side inertial member J1 and the transmission side inertial member J2 exceeds a pre-set angle W, such as by resonant vibrations, the two inertial members are engaged in the direction of rotation (in the circumferential direction) to produce large hysteresis to increase the vibration suppressing function between the members J1 and J2. The outer periphery of the thrust plate 16 is engaged relative to the rotational direction of the device with a pin designed for securing the driven plate 8 to the flywheel 7. The belleville spring 17 is retained by the head of the pin 11 for biasing the frictional member 15 towards and into abutment against the lateral surface of the flywheel 7 via thrust plate 16. Meanwhile, the frictional member 15 is frictionally engaged with (sandwichedly held) between the flywheel 7 and the thrust plate 16 under the bias exerted by the belleville spring 17.

In a radially mid portion of the first driving plate 2 are formed a plurality of substantially trapezoidally-shaped holes 29 for interconnecting the outer periphery of the first driving plate 2 and the inner periphery thereof bolted to the crankshaft 1 by a so-called arm-shaped connection. The holes 29 are trapezoidally-shaped in the sense that the holes are longer on the radially outer side and shorter on the radially inner sides. The center of the radially substantially trapezoidally-shaped hole and the apex of the polygonal spacer 20 (axial positioning member) face each other with the side of the spacer 20 facing the arm between the holes. The bolt hole by which the first drive plate 2 is secured to the crank shaft 1 are circumferentially at substantially same positions as the hole 29 (that is, substantially at the same angle as or radially substantially on the same line as the hole 29). This increases the abutment length and abutment area between the polygonally-shaped spacer 20 and the first driving plate 2 for dispersing concentrated stress by the axial bending stress for preventing fracture and improving durability of the first driving plate 2.

The function of the power transmitting mechanism having the torque fluctuation absorbing function will be explained. First, the function of the slide bearing mechanism is explained. The engine torque is transmitted from the first and second driving plates, 2, 3 via spring sheet 10, torsion spring 9, driven disk 8 and pin 11 to the flywheel 7. The inner periphery of the slide bearing 18 is engaged with the inner ring 6 as the engine side inertial member J1 relative to the rotational direction of the device such that the slide surface of the slide bearing 18 is limited to its outer peripheral surface 18a and hence slides only with respect to the inner peripheral surface of the flywheel 7 as the transmission side inertial member J2. By the slide surface being limited to one surface, in particular the outer peripheral surface, the lubricant oil is forcedly supplied by the centrifugal force to the slide surface to form the oil film to prevent wear of the slide surface to improve durability. This prevents concentricity deviation of the engine side inertial member J1 relative to the transmission side inertial member J2 from being increased to prevent vibration due to concentricity deviation from being increased. Meanwhile, the slide bearing may be engaged with the driven member about the rotational direction with the peripheral surface of the slide bearing facing the driving member then serving as the slide surface. In this case the driving member and driven member are disposed on the outer and inner side, respectively. For example, the inner ring may have an axially extending part, extending along the outer surface of the slide bearing, to form a sliding surface by an inner surface thereof. And the flywheel is axially extended toward the engine shaft side at the inner peripheral side of the slide bearing, for rotational engagement between the slide bearing and the axially extended part of the flywheel. The engagement surface and the slide surface may be reversed relative to each other.

The lubricant stored in the lubricant sink 18a is supplied to the outer peripheral surface of the slide bearing 18, serving as a lubricant film, under the centrifugal force generated by rotation of the device. The sealing member 22 prevents the lubricant from being leaked radially outwardly via a spacing between lateral sides of the flywheel 7 and the driven disk 8 under the centrifugal force. Also, even at the engine standstill time, with the centrifugal force being zero, the radially inner lateral side of the slide bearing 18 abuts against the radially inner lateral side of the flywheel 7 and on the radially inner side of the belleville spring for preventing lubricant leakage from the inner peripheral side. Meanwhile, if the inner peripheral surface of the slide bearing is slid relative to the driven member arranged on the inner peripheral side, there is provided a clearance between the inner peripheral surface of the slide bearing and a member facing the inner peripheral surface for permitting the lubricant to be supplied to the side surface.

Now the torsion mechanism will be explained. When the device is rotated, the torsion spring 9 is biased by the centrifugal force in the radially outer direction, that is towards the outer periphery of the first and second driving plates. However, the protrusion 10a of the spring sheet 10 is inserted into the inner cavity of the torsion spring 9 for retaining the torsion spring 9 relative to the substantially radially inner and outer sides, that is for inhibiting radial movement of the spring. This prohibits the spring 9 from being moved radially outwardly of the torsion spring 9 on the inner cavity side of the torsion spring thus eliminating the necessity of arranging the holder member for inhibiting the above movement on the outer peripheral side of the torsion spring 9. Thus, the torsion spring 9 can be arranged radially outwardly at a distance corresponding to the space which used to be occupied by the holding member. This renders it possible to use a torsion spring which has a lower rigidity (higher resiliency) or size by an amount corresponding to the radially outer disposition of the torsion spring 9. In addition, since the torsion spring of higher resiliency can be used, the torsion spring 9 and its near-by portion may be improved indurability to lower production cost. By arranging the stopper 10b at a mid portion on the inner cavity of the torsion spring, the torsion spring is limited in flexure to prevent its excessive loading and warping under the centrifugal force.

The inner peripheral sealing and small hysteresis mechanism (the first hysteresis mechanism) of the torsion mechanism will be explained. In the sealed spacing for holding the torsion spring 9 is sealed a lubricant (grease) for lubricating the spring sheet 10. The outer peripheral side of the spacing is sealed by the entire peripheral weld of the first and second driving plates 2, 3, while the inner peripheral side thereof is sealed by the frictional member 13 disposed between (about the axial direction) the first and second driving plates 2, 3, driven disk 8, belleville spring 14 and the frictional member 12. In addition, if the first and second driving plates 2, 3 are rotated relative to the driven plate 8, the frictional members 13, 12 are slid relative to the first and second driving plates 2, 3 to produce hysteresis. Since the inner peripheral sealing of the spacing housing the torsion spring 9 is by surface contact of the frictional members 13, 12 with the first and second driving plates 2, 3, the lubricant is not liable to leakage to improve durability of the torsion mechanism. Moreover, if the frictional members suffer certain amount of wear, the frictional members 13, 12 are biased and urged by the belleville spring 14 towards first and second driving plates 2, 3, thus maintaining the above-mentioned surface contact state. By providing a mechanism operating simultaneously as the sealing mechanism and as the hysteresis mechanism, the device can be rendered compact in size.

Moreover, by the flywheel 7, the clutch disk assembly 26 etc. in their entirety being moved towards left in FIG. 1 by wear occurring to the frictional member 12, and by the belleville spring 14 biasing the frictional member 13 via driven disk 8 towards the first driving plate 2, the amount of float (loosening) of lever members 24 biasing the diaphragm spring 25 caused by prolonged use can be corrected for eliminating excess play in the clutch operation.

The function of the second hysteresis mechanism will be now explained. By relative rotation between the engine side inertial member J1 and the transmission side inertial member J2, the frictional member 15 in the second frictional member is slid against the lateral side of the flywheel 7 and the thrust plate 16 to generate hysteresis and frictional heat. In particular, the thrust plate 16 having a small heat capacity tends to be raised in temperature. However, since the thrust plate 16 is disposed in an open space, this frictional heat is dissipated to an external space so that the frictional member 15 does not suffer wear by excess heating thus improving durability. Moreover, there is a clearance W in the circumferential direction, friction occurs only as a relative torsion angle of W or more between the members J1 and J2.

Namely, since the heat of friction is generated intermittently, the heat dissipation effect is enhanced. Since the frictional member 15 is improved in this manner in cooling performance, the frictional member 15 can be of a lower grade to reduce cost. It is also possible to array the frictional member axially between the driving members for facing the driven members with a clearance of a pre-set angle in the rotational or circumferential direction so that, if relative rotation between J1 and J2 beyond a pre-set angle occurs, the frictional member is engaged with the driven member so that the frictional member will be frictionally slide relative to the driving member which has sandwichedly held the frictional member.

Since the mechanisms making up the power transmitting mechanism are improved in durability in this manner, the power transmitting mechanism is naturally improved in durability. Moreover, by using the slide bearing, the device is lowered in cost. In addition, by using a common sealing mechanism for the mechanism and for the torsion mechanism, the device may be rendered compact in size.

Also, the first hysteresis mechanism simultaneously used as the sealing mechanism of the torsion mechanism and the second hysteresis mechanism render it possible to realize multi-stage hysteresis by a compact structure. Although the description has been made of application of the power transmitting mechanism of the present invention to a torque fluctuation absorbing mechanism, the present invention is not limited to this torque fluctuation absorbing mechanism and can also be generally applied to other power transmitting mechanisms, such as clutch mechanism. The sliding surface of the slide bearing can be changed from the outer periphery to the inner periphery, and the engagement in the rotational direction of the slide bearing can be changed from the driving member to the driven member. The sliding surface of the frictional member can be changed from the driving member to the driven member. The same applies for members engaged by the frictional member in the rotational direction.

Referring to FIGS. 6 to 10, a power transmitting mechanism according to another embodiment of the present invention will be explained. For this power transmitting mechanism, only the points differing in structure and function from the power transmitting mechanism of the previous embodiment are explained.

Figure 8:
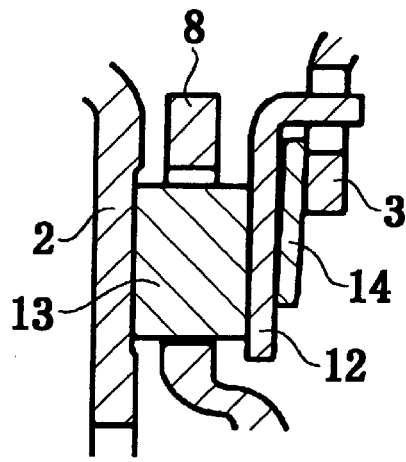
FIG. 8 is an enlarged partial view showing a first hysteresis mechanism shown in FIG. 6.

Referring to FIG. 8, the first hysteresis mechanism is disposed on the inner peripheral side of the torsion mechanism in the absence of lubricant and on the outer peripheral side of the bearing. This first hysteresis mechanism is made up of plural frictional members 13, each slidingly contacted with the first driving plate 2, a thrust plate 12 abutted against the surface of the frictional member directed to the driving plate 3, and a belleville spring 14 interposed under compression between the thrust plate 12 and the driving plate 3. These component members of the first hysteresis mechanism are arranged circumferentially at pre-set distances from one another. The frictional members 13, arranged in their entirety in a ring shape, are sandwichedly interposed between the first and second driving plates 2, 3 by being biased by the belleville spring 14 via an annular thrust plate 12. The frictional members 13 are passed through plural holes or cutouts formed at a pre-set distance along the circumference of the driven plate 8 as shown in FIG. 7. Between the frictional members 13 and the inner wall of the holes of the driven plate 8 are formed a pre-set clearances W1 in the circumferential direction. The outer peripheral end of the thrust plate 12 is bent and extended along the axis towards and across the second driving plate 3. The inner periphery of the second driving plate 3 is formed with a hole through which is passed the above-mentioned extension of the thrust plate 12. By this extension and the hole, the thrust plate 12 is held by the second driving plate 3 and positioned or engaged blockedly about the circumferential direction.

The function of the first hysteresis mechanism will now be explained. In this first hysteresis mechanism, since the clearances W1 are provided between the frictional member 13 and the driven plate 8 in the circumferential direction, the driven plate 8 is abutted against the frictional members 13, if the relative torsional angle (amplitude) between J1 (driving members and first and second driving plates) and J2 (driven members and driven plate) is not less than W1, the driven plate 8 is abutted against the frictional members 13, so that the frictional members 13 are thereby biased and slid relative to the driving plate 2 to produce a frictional force. That is, the hysteresis can be changed depending on the amplitude value. Moreover, since the frictional members are arranged in a split form, a frictional material of high productivity and low cost can be used. In addition, the first hysteresis mechanism of the instant embodiment has a smaller number of components parts than that of the previous embodiment.

A preferred modification of the above-described first hysteresis mechanism will be explained. The clearances w1 can be set to different values. For example, the values of the clearances W1 are varied stepwise. This enables hysteresis changed in plural steps (or multi-stepwise) to be set responsive to the relative angles of torsion. Of the clearances W1, some are set to zero, that is, substantially no gap is left between the frictional members and the driven plate. This sets different hysteresis values for low and high torsional angles to render it possible to use a common structure for the first hysteresis mechanism and the second hysteresis mechanism, that is a small mechanism and a large mechanism, or a mechanism operated perpetually if a relative torsion is produced and a mechanism in/out of operation depending on the value of the relative angle of torsion.

Figure 9:
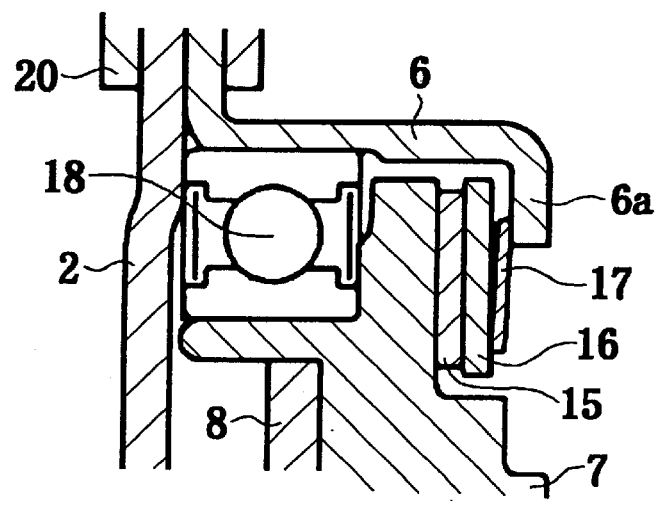
FIG. 9 is an enlarged partial view showing a second hysteresis mechanism shown in FIG. 6.

Referring to FIG. 7 and FIG. 9, the second hysteresis mechanism is arranged on the inner side of the clutch mechanism (clutch disk assembly) on the inner peripheral side of the slide surface of the clutch disk axially between the clutch mechanism and the flywheel 7. This second hysteresis mechanism is made up of plural split frictional members 15 at 120° angular positions (by center to center), a ring-shaped thrust plate 16 abutted against the frictional members 15 and a belleville spring 17 interposed by a thrust plate 16. The frictional members 15 are sequentially arrayed axially between the flywheel 7 and the flanged portion 6a (radially outwardly protruded distal end) of an inner ring (receiving a bearing inner race) 6 press-formed of steel sheets. The engine side surface of the frictional members 15 is abutted against the transmission side surface of the flywheel 7. The opposite side surface of the frictional members 15 is formed with plural protrusions extending along the axial direction from the radially mid portion of the frictional members 15. Likewise to the thrust plate 12 shown in FIG. 8, inner peripheral end of the thrust plate 16 is bent and axially extend towards the transmission side (not shown in FIG. 9). The extension of the thrust plate 16 is passed through holes or cut outs in the flange portion 6a of the inner ring 6 into engagement with the holes or the cut outs. This sets the thrust plate 16 in position. An outer race of the ball bearing 18 is retained by a bearing-receiving flange of the flywheel 7.

In the cylindrical surface of the inner ring 6 on the radially inner side of the gaps between the neighboring frictional members 15 (at the same angular interval in the circumferential direction), there are formed radially through-holes in register with the gaps. These through-holes reduce the friction of the frictional members 15 because these promote cooling properties of the frictional members 15 and the thrust plate 16 and discharging of debris of the frictional material thus reducing friction of the frictional members. For improving the wear resistance and stabilizing the frictional torque, the frictional members 15 are preferably formed of polyimide.

The function of the second hysteresis mechanism will be explained. Due to relative rotation between the engine side inertial members J1 and the transmission side inertial members J2, the frictional members 15 of the second hysteresis mechanism are slid relative to the lateral surface of the flywheel 7 and the thrust plate 16 to generate hysteresis and the frictional heat. It is noted that the thrust plate 16 tends to be raised in temperature because of its small thermal capacity. Since the thrust plate 16 is disposed in an open space and also holes are formed in the pre-set positions of the inner ring 6, this heat of friction is dissipated promptly to outer space so that friction of the frictional members 15 and the near-by portions cannot proceed readily thus improving durability.

Moreover, a clearance may be disposed in the circumferential direction between the frictional members 15 and the inner ring 6. Also, a guide groove may be press-formed along the circumferencial direction on the part of the first driving plate against which the friction members 15 slidingly abut.

Next, the bearing mechanism between the engine side inertial members J1 and the transmission side inertial members J2 will be explained. As bearings between J1 and J2, there is provided the ball bearing 18 on the inner peripheral side of the power transmitting mechanism in a spacing defined by the driving plate 2, flywheel 7 and the inner ring 6. The inner peripheral side of the ball bearing 18 is engaged with the inner ring 6 secured to the crankshaft 1 about the rotational direction. The outer race and inner race surfaces of the ball bearing 18 form rolling surfaces for balls. The axial load applied to the ball bearing 18 is received by the flange portion 6a of the inner ring 6 so that the belleville spring 17 biases the ball bearing 18 towards the first driving plate 2 via flywheel 7 abutted against the outer periphery of the transmission side end face of the ball bearing 18. On the other hand, the inner periphery of the first driving plate 2 facing the ball bearing 18 is worked by drawing to form a recess so that the engine side end face of the ball bearing 18 has its inner periphery (inner race) abutted against the first driving plate 2, whereas the outer periphery (outer race) does not abut.

By securing the driven plate 8 and the flywheel 7 by screwing using bolts 11, there is applied no large radial compared to the securing using rivets, there is applied no excessive pressure on the ball bearing 18 to improve bearing service life.

Figure 6:
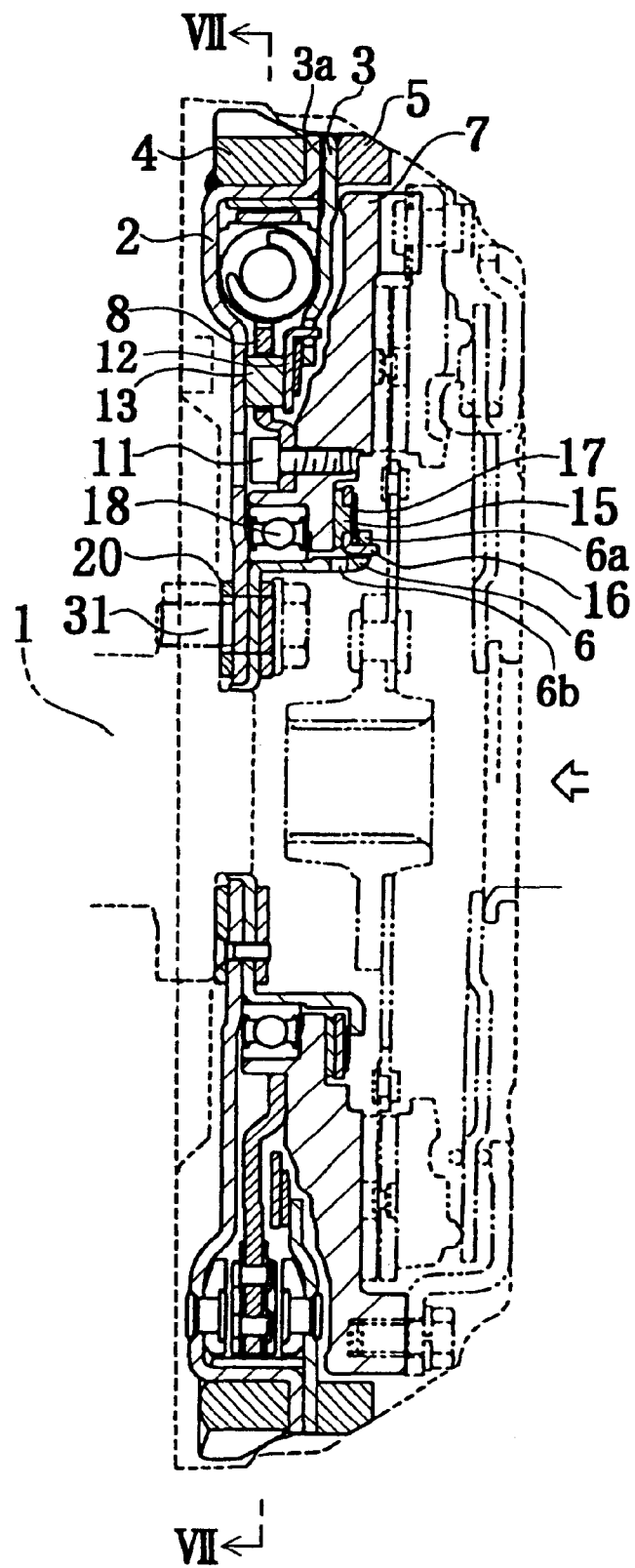
FIG. 6 is a cross-sectional side view of a power transmitting mechanism according to another embodiment of the present invention.

Now, the inertial member provided on the outer periphery of the power transmitting mechanism for reducing rotational fluctuations will be explained. Referring to FIG. 6, the inertial member 5 is previously mounted by welding prior to assembling the entire power transmitting mechanism on the outer periphery of the inertial member 5. Since this increases the inertial of the engine side inertial members J1, input vibrations may be reduced in amplitude. As the inertial member 5, steel strip or drawn material subjected to roll shaping is preferably employed. This increases a yield of materials and reduces costs. An inertial member is preferably mounted on the outer periphery of the flywheel 7. This increases the inertial of the power transmitting mechanism. Also the flywheel 7 is of a pot type, i.e., in which the mounting surface of the clutch cover is disposed on the transmission side as compared with the friction surface, resulting in an increased weight of the outer periphery of the flywheel 7. This increases the inertial of the transmission side inertial members J2 so that rotational fluctuations relative to torque fluctuations transmitted via a torsion spring as later explained are reduced.

Figure 10:
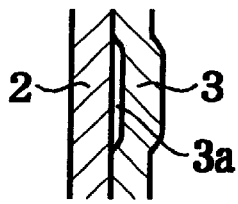
FIG. 10 is an enlarged partial view showing an abutment portion of the first and second driving plate shown in FIG. 6.

Referring again to FIG. 6, the ring gear 4 is arranged on the flanged surface formed on the outer periphery of the first driving plate 2. This ring gear 4 is mounted on the engine side of the inertial member 5 which is welded to the driving plate. The toothed surface of the ring gear 4 is chamfered by an amount corresponding to the tooth height. Since a chip outlet side portion during hobbing is chamfered, it becomes possible to eliminate the deburring step because the amount of burrs produced is reduced. In particular, if a resin sheet is used in the torsion mechanism, the first driving plate 2 and the second driving plate 3 are preferably welded to each other at a position as remote from the resin sheet as possible. In the power transmitting mechanism shown in FIG. 10, the first driving plate 2 and the second driving plate 3 are welded to each other at the respective outer peripheral portions by fillet welding, all around welding or spot welding. Referring to FIG. 10, on an abutment surface of the outer peripheries of the first driving plate 2 and the second driving plate 3, there is provided a partial gap 3a for communication between the spacing on the inner peripheral side of the abutment surfaces and outside. In this spacing is arranged the torsion mechanism. Via this partial gap, mud or soil entering the spacing for the torsion mechanism is discharged, at the same time as the cooling effect of air circulation is improved. Although the recess is formed towards the second driving plate 3 in the illustration of FIG. 10, such recess may also be provided towards the first driving plate 2 or on both driving plates 2, 3.

Referring in particular to FIG. 7, the torsion mechanism of the present embodiment is made up of plural torsion springs 9 arranged in tandem in a spacing surrounded by the first and second driving plates 2 and 3 on the outer peripheral side of the device angularly between the first and second torsion springs 2, 3 and the driven plate 8. Of the torsion springs 9, torsion springs 9b on both end portions (portions that the first and second driving plates 2, 3 circumferentially sandwich the torsion spring 9b and are disposed close to the driven plate 8) are of thinner spring wire such that the spring constants of these both end torsion springs 9b are smaller than those of the internal torsion springs 9a. In other words, the both end torsion springs 9a are reduced in size. On the first and second driving plates 2, 3 are mounted block members abutted via spring sheet 10 on the torsion springs 9b for thrusting the torsion springs 9b. These block members operate for increasing the inertia of the driving side (engine side) inertial members. The spring sheet 10 fitted to one end of the opposite side torsion spring has a recess engageable with a projection formed on the outer periphery of the driven plate facing the recess. The spring sheets 10 are fitted with each end of the torsion springs 9a, 9b. The spring sheet 10 is formed with a substantially triangular-shaped base protruded radially inwardly and boss portions 10a protruded from both lateral sides of the base. The boss portions 10a are fitted with the inner periphery (inner cavity) of the torsion springs 9a, 9b for supporting the torsion springs in the radial direction of the power transmitting mechanism. However, the boss portions 10a fitted on the inner side of both end internal torsion springs 9b in the rotational direction are larger in diameter than the boss portion engaged with the internal torsion spring 9a. The spring sheets 10 having both end boss portions fitted on the internal torsion spring 9a are substantially symmetrical in configuration. The outer peripheral surface of the spring sheet is fitted with a slider 10c of low frictional coefficient molded as-one body solid with the spring sheet. The slider may be inserted in the spring sheet with a bent for preventing loosening out. The slider 10c is in sliding contact with the inner peripheral surface of the first driving plate 2. Since the radial size (width) of the spring sheet is selected to be larger than the radial size of the torsion springs 9a, 9b, the torsion springs 9a, 9b are prevented form being in sliding contact with the inner peripheral surface of the first driving plate 2.

Figure 11:
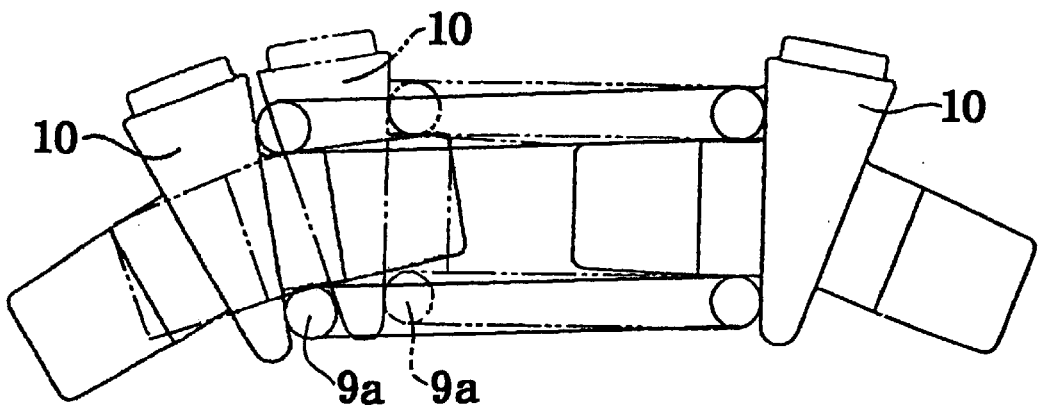
FIG. 11 illustrates a preferred form of a torsion spring.

On the inner periphery of the inner torsion spring 9a is arranged a stopper 10b abutted against the spring sheet 10 on compression of the torsion spring 9a. The bit end torsion springs 9b are not provided with spring stoppers, such that, on compression of the torsion springs 9b, the end faces of the boss portions 19a of the spring sheet are directly abutted against each other. Now, referring to FIG. 11, the torsion springs 9a, 9b are disposed open toward outerior at the initial position (Outer periphery of the spring is longer than the inner periphery. The distance between the spring seals (end faces) is longer at a radially outer part than at a radially inner part, the spring seal is disposed with a specified angle, in the initial position, relative to the radial line extending from the center of the power transmitting mechanism so that the spring seals are disposed parallel to each other at the maximum compression.).

The function of the torsion mechanism will be explained. When the device is run in rotation, the torsion spring 9 is biased radially under the centrifugal force. However, the boss portions 10a of the spring sheets 10 are inserted in the inner cavity of the torsion springs 9a, 9b for retaining the torsion springs 9a, 9b with respect to the radially inner and outer directions. In addition, the radial dimension of the spring sheet 10 is larger than the diameters of the torsion springs 9a, 9b, and the slider 10c is provided on the outermost periphery of the spring sheet, so that, on occurrence of torque fluctuations, the torsions springs 9a, 9b are positively prevented from coming into contact with and sliding against the inner peripheral surface of the first driving plate 2.

With increasing torsional angle between the first and second driving plates 2, 3 and the driven plate 8, the amount of compression of the torsion springs 9a, 9b is increased. However, the boss portions 10a of the spring sheets 10 are abutted against each other for limiting the amount of compression of the torsion springs 9a, 9b.

Figure 12:
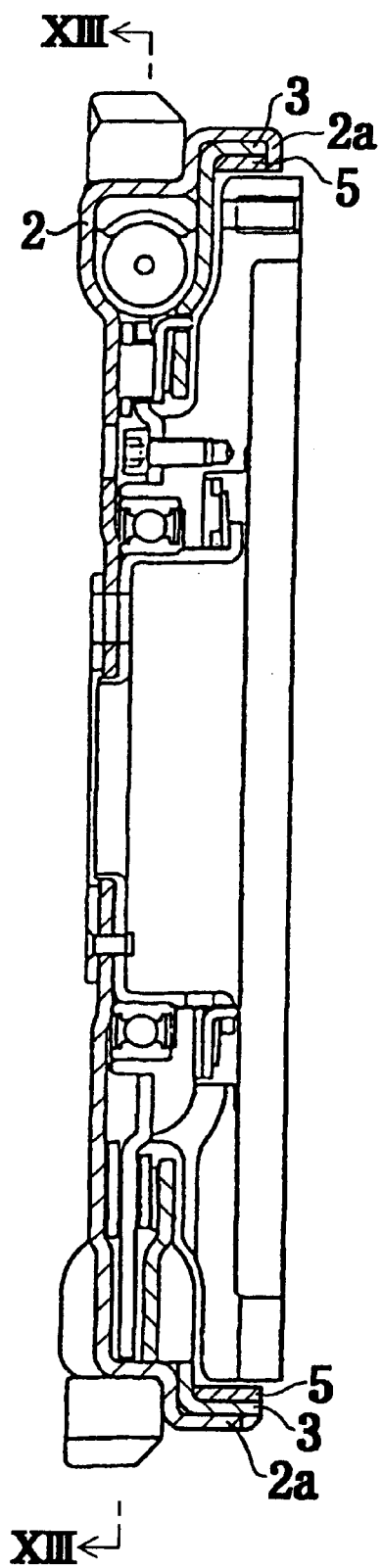
FIG. 12 is a cross-sectional side view of a power transmitting mechanism according to a further embodiment of the present invention.
Figure 13:
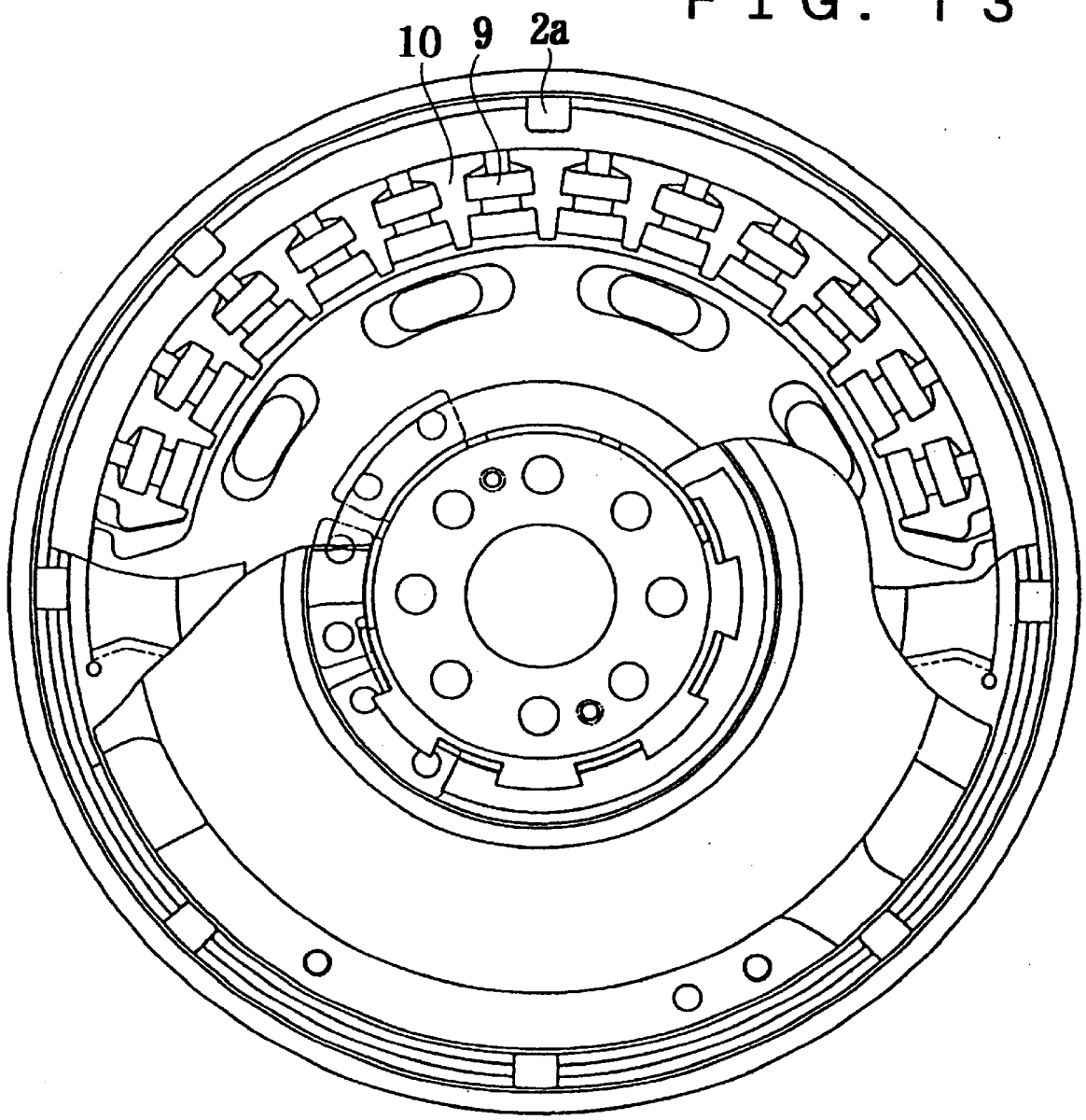
FIG. 13 is a cross-sectional view taken along line XIII—XIII of FIG. 12, with portions being broken away.

Now referring to FIGS. 12 and 13, still a further embodiment of the power transmitting mechanism will be elucidated. In this embodiment, the first driving plate 2 has an outer peripheral end formed as a tongue 2a. The inertia 5 is clamped between the tongue 2a and the second driving plate 3 by caulking. The torsion spring 9 is made of a hollow cylindrical rubber member having high elasticity.

It should be noted that any modification obvious in the art may be done without departing from the gist and scope as disclosed herein and claimed appended herewith.

What is claimed is:

1. A power transmitting-mechanism in which a driving member rotatingly transmitting power and a driven member receiving the transmitted power to be rotated are arranged substantially concentrically relative to each other for rotation relative to each other, wherein a torsion member absorbing rotational torque fluctuations is arranged in tandem angularly between the driving member and the driven member; and a spring sheet is inserted from an end of said torsion member into an inner cavity side for retaining the torsion member in the radial direction;

wherein the driven member and the spring sheet each possess an end face, with the end face of the spring sheet facing the end face of the driven member, the end face of the driven member possessing a projection engaging the end face of the spring sheet for supporting centrifugal force acting on the spring sheet; and wherein a surface of the driving member facing a radially outwardly facing circumferential end face of the driven member for guiding the sliding of the spring sheet has a radius gradually increasing in a direction along which the spring sheet moves.

2. A power transmitting mechanism in which a driving member rotatingly transmitting power and a driven member receiving the transmitted power to be rotated are arranged substantially concentrically relative to each other for rotation relative to each other via a bearing, wherein a torsion mechanism absorbing rotational torque fluctuations of the driving member and the driven member is accommodated between said driving member and the driven member;

a first hysteresis mechanism is provided on the inner peripheral side of a spacing accommodating said torsion mechanism, said first hysteresis mechanism having at least one frictional member generating hysteresis by sliding of the frictional member relative to the driving member or the driven member, and a second hysteresis mechanism arranged outside the spacing accommodating said torsion mechanism for generating hysteresis different from that generated by said first hysteresis mechanism by sliding of said frictional member;

said first hysteresis mechanism being arranged on the inner peripheral side of the torsion mechanism and on the outer peripheral side of said bearing, said frictional member of the first hysteresis mechanism being split into plural portions and being held in a clamped manner within said driving member via a belleville spring or a thrust plate, each one of the plural portions of the frictional member of the first hysteresis mechanism passing through one of a hole or a cut-out formed in the driven member with a clearance formed circumferentially between said each one of the plural portions of the frictional member passing through the driven member and its respective said one of the hole or cutout, the clearance associated with at least one of said plural portions having a size different from the clearance associated with at least another one of said plural portions.

3. The power transmitting mechanism as defined in claim 2 wherein the clearance associated with at least one of said plural portions is substantially a zero clearance.

4. The power transmitting mechanism as defined in claim 3 wherein a frictional surface area of the one of said plural portions associated with said substantially zero clearance is larger than a frictional surface area of another one of said plural portions whose associated clearance with its respective said one of a hole or cut-out is larger than zero.

5. A power transmitting mechanism in which a driving member rotatingly transmitting power and a driven member receiving the transmitted power to be rotated are arranged substantially concentrically relative to each other for rotation relative to each other via a bearing, wherein a torsion mechanism absorbing rotational torque fluctuations of the driving member and the driven member is accommodated between said driving member and the driven member;

a first hysteresis mechanism is provided on the inner peripheral side of a spacing accommodating said torsion mechanism, said first hysteresis mechanism having at least one frictional member generating hysteresis by sliding of the frictional member relative to the driving member or the driven member and a second hysteresis mechanism arranged outside the spacing accommodating said torsion mechanism for generating hysteresis different from that generated by said first hysteresis mechanism by sliding of said frictional member;

a flywheel connected to the driven member;

a clutch mechanism abutted against or substantially spaced apart from the flywheel for connecting or disconnecting power transmission; and a release bearing mechanism axially displacing said clutch mechanism for causing said clutch mechanism to connect or disconnect power transmission;

the second hysteresis mechanism including at least one frictional member that is adapted to be slid against the flywheel, the direction of a thrusting force operating on the frictional member of the second hysteresis member being the same as the direction of movement when said release bearing mechanism disconnects power transmission via said clutch mechanism;

said release bearing mechanism being of a push type that is moved towards the engine side upon interruption of power transmission; and said second hysteresis mechanism being arranged on the side of a frictional surface of the flywheel that is slid against the clutch mechanism.

6. A power transmitting mechanism in which a driving member rotatingly transmitting power and a driven member receiving the transmitted power to be rotated are arranged substantially concentrically relative to each other for rotation relative to each other via a bearing, wherein a torsion mechanism absorbing rotational torque fluctuations of the driving member and the driven member is accommodated between said driving member and the driven member;

a first hysteresis mechanism is provided on the inner peripheral side of a spacing accommodating said torsion mechanism, said first hysteresis mechanism having at least one frictional member generating hysteresis by sliding of the frictional member relative to the driving member or the driven member and a second hysteresis mechanism arranged outside the spacing accommodating said torsion mechanism generating hysteresis different from that generated by said first hysteresis mechanism by sliding of said frictional member;

said second hysteresis mechanism including at least one frictional member;

a thrust plate arranged between the frictional member of the second hysteresis mechanism and the driving member or the driven member; and a protrusion provided on the frictional member of the second hysteresis mechanism for engaging a hole formed in the thrust plate for circumferentially engaging with the frictional member.

7. A power transmitting mechanism in which a driving member rotatingly transmitting power and a driven member receiving the transmitted power to be rotated are arranged substantially concentrically relative to each other for rotation relative to each other via a bearing, wherein a torsion mechanism absorbing rotational torque fluctuations of the driving member and the driven member is accommodated between said driving member and the driven member;

a first hysteresis mechanism is provided on the inner peripheral side of a spacing accommodating said torsion mechanism, said first hysteresis mechanism having at least one frictional member for generating hysteresis by sliding of the frictional member relative to the driving member or the driven member and a second hysteresis mechanism having at least one frictional member arranged outside the spacing accommodating said torsion mechanism for generating hysteresis different from that generated by said first hysteresis mechanism by sliding of said frictional member of the first hysteresis mechanism, said frictional member of said second hysteresis mechanism being split into plural portions;

an inner ring provided on peripheral surfaces of the plural portions of the frictional members of the second hysteresis mechanism, and the inner ring having a peripheral surface that is engageable with the plural portions with respect to the circumferential direction;

said plural portions having circumferential gaps relative to each other; and the peripheral surface of the inner ring being formed with holes communicating with the gaps between the plural portions.

8. A power transmitting mechanism in which a driving member rotatingly transmitting power and a driven member receiving the transmitted power to be rotated are arranged substantially concentrically relative to each other for rotation relative to each other with a bearing arranged between the driven member and the driving member, the driven member including a flywheel, wherein a torsion mechanism absorbing rotational torque fluctuations of the driving member and the driven member is accommodated between said driving member and the driven member;

a first hysteresis mechanism is provided on the inner peripheral side of a spacing accommodating said torsion mechanism, said first hysteresis mechanism having at least one frictional member generating hysteresis by the sliding of the frictional member relative to the driving member or the driven member and a second hysteresis mechanism having at least one frictional member and arranged outside the spacing accommodating said torsion mechanism for generating hysteresis different from that generated by said first hysteresis mechanism by the sliding of said frictional member of the first hysteresis mechanism;

a thrust spring biasing the frictional member of the second hysteresis mechanism towards a sliding surface of the flywheel, a biasing force of the thrust spring acting in the same direction as the direction in which the bearing is inhibited form being pulled out.

9. A power transmitting mechanism in which a driving member rotatingly transmitting power and a driven member receiving the transmitted power to be rotated are arranged substantially concentrically relative to each other for rotation relative to each other, wherein a torsion member absorbing roatational torque fluctuations is arranged in tandem angularly between the driving member and the driven member; and a spring sheet inserted from an end of said torsion member into an inner cavity side for retaining the torsion member in the radial direction;

said torsion member including tandem arranged plural torsion springs having different spring constants, the torsion springs having smaller spring constants being arranged on both ends and the torsion springs having larger spring constants being arranged on an inner side.

10. The power transmitting mechanism as defined in claim 9 wherein the torsion springs having smaller spring constants are reduced in wire diameter.

11. The power transmitting mechanism as defined in claim 9 wherein the plural torsion springs, arranged in tandem have the same length at a maximum compression.

12. A power transmitting mechanism in which a driving member rotatingly transmitting power and a driven member receiving the transmitted power to be rotated are arranged substantially concentrically relative to each other for rotation relative to each other, wherein a torsion member absorbing rotational torque fluctuations is arranged in tandem angularly between the driving member and the driven member; and a spring sheet is inserted from an end of said torsion member into an inner cavity side for retaining the torsion member in the radial direction;

said driving member including a first driving plate and a second driving plate abutting against each other, said torsion member being disposed in a spacing surrounded by said first and second driving plates; and a gap provided in an abutment surface of said first and second driving plates for establishing communication of said spacing with the outside.

13. The power transmitting mechanism as defined in claim 12 wherein said gap is a recess formed in one of said first driving plate or said second driving plate.

14. A power transmitting mechanism in which a driving member rotatingly transmitting power and a driven member receiving the transmitted power to be rotated are arranged substantially concentrically relative to each other via a bearing for rotation relative to each other, the driven member including a flywheel and wherein the bearing includes an inner race and an outer race, one of said inner race and said outer race of said bearing being secured to the driven member, said outer race of said bearing being axially in contact with said flywheel, the driving member including an inner ring having a flange surface that axially supports said outer race of said bearing with a hysteresis mechanism and a portion of the flywheel being interposed between the flange surface and the outer race of the bearing.

15. The power transmitting mechanism as defined in claim 14 wherein a thrust plate abutted against a frictional member of the hysteresis mechanism and having its one end extending towards the flange surface is arranged between the frictional member of the hysteresis mechanism and said flange surface; and wherein said flanged surface is formed with one of a cut-out or hole for inhibiting rotation of said thrust plate, said cut-out or hole being engageable by a portion of the thrust plate extending towards said flanged surface.

16. A power transmitting mechanism in which a driving member rotatingly transmitting power and a driven member receiving the transmitted power to be rotated are arranged substantially concentrically relative to each other for rotation relative to each other, wherein a torsion mechanism absorbing rotational torque fluctuations of the driving member and the driven member is accommodated between said driving member and the driven member;

a first hysteresis mechanism is provided on the inner peripheral side of a spacing accommodating said torsion mechanism, said first hysteresis mechanism having at least one frictional member generating hysteresis by the sliding of the frictional member relative to the driving member or the driven member and a second hysteresis mechanism having at least one frictional member and arranged outside the spacing accommodating said torsion mechanism generating hysteresis different from that generated by said first hysteresis mechanism by the sliding of said frictional mechanism of the first hysteresis mechanism, the frictional member of said second hysteresis mechanism being split into plural portions;

said driving member and said driven member being disposed substantially coaxially and rotatably relative to each other via a bearing; and an angular clearance disposed between an inner ring engaged with an engine output shaft and a frictional member of the second hysteresis member.

* * * * *